US012672200B2

(12) United States Patent
Lu et al.

(10) Patent No.: US 12,672,200 B2
(45) Date of Patent: Jun. 30, 2026

(54) MESSAGE TRANSMISSION METHOD, APPARATUS AND SYSTEM IN INTEGRATED ACCESS AND BACKHAUL SYSTEMS

(71) Applicant: 1FINITY Inc., Kawasaki (JP)

(72) Inventors: Yang Lu, Beijing (CN); Su Yi, Beijing (CN); Meiyi Jia, Beijing (CN); Guorong Li, Beijing (CN)

(73) Assignee: 1FINITY Inc., Kawasaki (JP)

( * ) Notice: Subject to any disclaimer, the term of this patent is extended or adjusted under 35 U.S.C. 154(b) by 327 days.

(21) Appl. No.: 18/384,944

(22) Filed: Oct. 30, 2023

(65) Prior Publication Data

US 2024/0057205 A1 Feb. 15, 2024

Related U.S. Application Data

(63) Continuation of application No. PCT/CN2021/091967, filed on May 6, 2021.

(51) Int. Cl.
*H04W 76/27* (2018.01)
*H04W 28/08* (2023.01)
*H04W 74/0833* (2024.01)

(52) U.S. Cl.
CPC ....... *H04W 76/27* (2018.02); *H04W 28/0867* (2020.05); *H04W 74/0833* (2013.01)

(58) Field of Classification Search
CPC ............. H04W 76/27; H04W 28/0867; H04W 74/0833; H04W 36/0019; H04W 76/20;
(Continued)

(56) References Cited

U.S. PATENT DOCUMENTS

2017/0005913 A1 1/2017 Hampel et al.
2019/0394084 A1* 12/2019 Tsai ..................... H04W 40/24
(Continued)

FOREIGN PATENT DOCUMENTS

CN 110536350 A 12/2019
CN 110798902 A 2/2020
CN 111757484 A 10/2020

OTHER PUBLICATIONS

WO_2021093210_A1 (Year: 2021).*
(Continued)

*Primary Examiner* — Rushil P. Sampat
(74) *Attorney, Agent, or Firm* — Myers Wolin, LLC

(57) ABSTRACT

A message transmission apparatus, applicable to a first integrated access and backhaul node (IAB-node) includes: a receiver configured to: receive a second radio resource control (RRC) reconfiguration message for path migration of a second IAB-node while the first IAB-node is still connected with source parent node, the second radio resource control (RRC) reconfiguration message being transmitted by a donor central unit (donor-CU), the second IAB-node is a downstream child node of the first IAB-node; and receive a first RRC reconfiguration message for path migration of the first IAB-node, the first RRC reconfiguration message being transmitted by the donor-CU; and a transmitter configured to forward, to the second IAB-node, the second RRC reconfiguration message which is withhold until random access of the first IAB-node is successful.

10 Claims, 18 Drawing Sheets

(58) Field of Classification Search
CPC ..... H04W 40/36; H04W 76/19; H04W 24/02; H04W 36/0072; H04W 36/08; H04W 84/047; H04W 88/08; H04W 88/085
See application file for complete search history.

(56) References Cited

U.S. PATENT DOCUMENTS

| | | | | |
|---|---|---|---|---|
| 2020/0045745 | A1 | 2/2020 | Cirik et al. | |
| 2021/0360439 | A1* | 11/2021 | Akl | H04W 84/047 |
| 2022/0141749 | A1* | 5/2022 | Luo | H04W 36/305 |
| | | | | 370/331 |
| 2022/0225060 | A1* | 7/2022 | Akl | H04W 76/22 |
| 2022/0369190 | A1* | 11/2022 | Diao | H04W 36/12 |
| 2023/0262827 | A1* | 8/2023 | Liu | H04W 76/20 |
| | | | | 370/329 |
| 2023/0371110 | A1* | 11/2023 | Zhu | H04W 36/0009 |

OTHER PUBLICATIONS

WO_2022082683_A1 (Year: 2022).*
Notice of Reasons for Refusal issued by the Japan Patent Office for corresponding Japanese Patent Application No. 2023-566914, mailed on Oct. 15, 2024, with an English translation.

Qualcomm Incorporated, Interruption time reduction for Intra-donor IAB-node Migration, Agenda Item: 13.2.2, 3GPP TSG-RAN WG3 Meeting #111-e, R3-210348, E-meeting, Jan. 25-Feb. 5, 2021.
AT&T, Service interruption reduction for intra-donor migration of IAB-node with descendant nodes, Agenda Item: 13.2.2, 3GPP TSG-RAN WG3 Meeting #111-e R3-210657, Online, Jan. 25-Feb. 4, 2021.
The partial supplementary European search report with Written Opinion issued by the European Patent Office for corresponding European Patent Application No. 21939656.1, mailed on Jun. 3, 2024.
Samsung, "[AT113bis-e][211][MOB] DAPS corrections (Samsung)", Agenda Item: 6.4.2, 3GPP TSG-RAN WG2 #113bis-e, R2-2104312, Electronic Meeting, Apr. 12-20, 2021.
International Search Report and Written Opinion of the International Searching Authority issued by China National Intellectual Property Administration for International Patent Application No. PCT/CN2021/091967, mailed on Feb. 9, 2022, with an English translation.
Fujitsu, "Discussion on inter-donor IAB migration", Agenda Item: 13.2.1, 3GPP TSG-RAN WG3 #110-e, R3-206107, Online, Nov. 2-12, 2020.
Fujitsu, "Discussion on inter-donor IAB migration", Agenda Item: 13.2.1, 3GPP TSG-RAN WG3 #111-e, R3-210458, Jan. 25-Feb. 4, 2021.

* cited by examiner

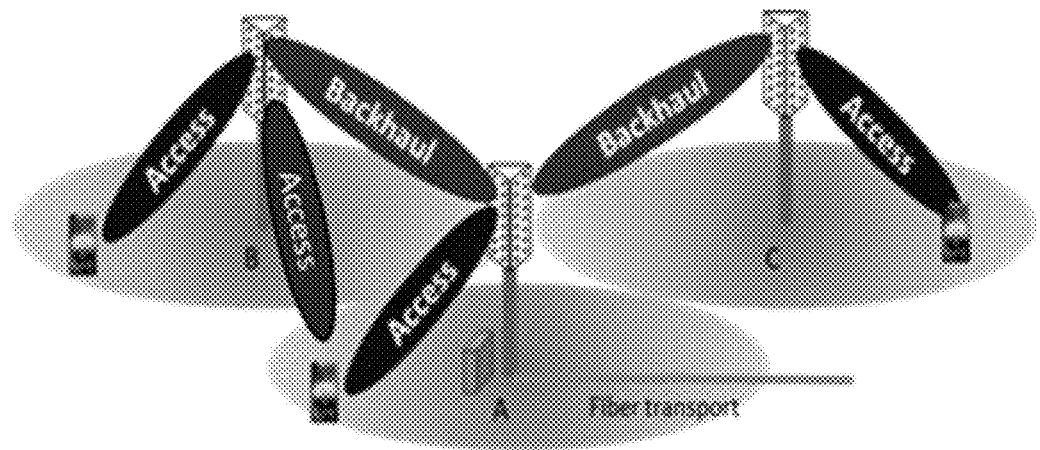
Fig. 1
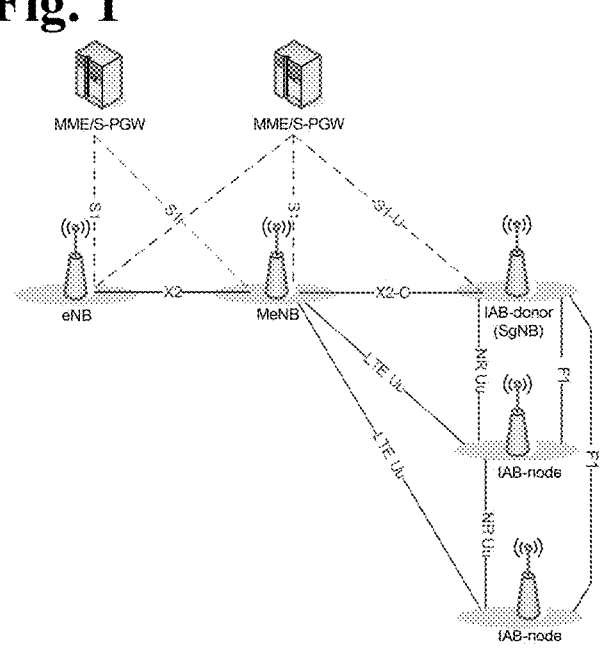
Fig. 2                    Fig. 3

IAB-node 2           IAB-node 1           IAB-donor-DU        IAB-donor-CU-UP

801 the first IAB-node receives, a second radio resource control (RRC) reconfiguration message for path migration of a second IAB-node from a donor-CU

802 the first IAB-node receives, a first RRC reconfiguration message for path migration of the first IAB-node from the donor-CU

803 the first IAB-node forwards the second RRC reconfiguration message to the second IAB-node when random access is successful

Fig. 8

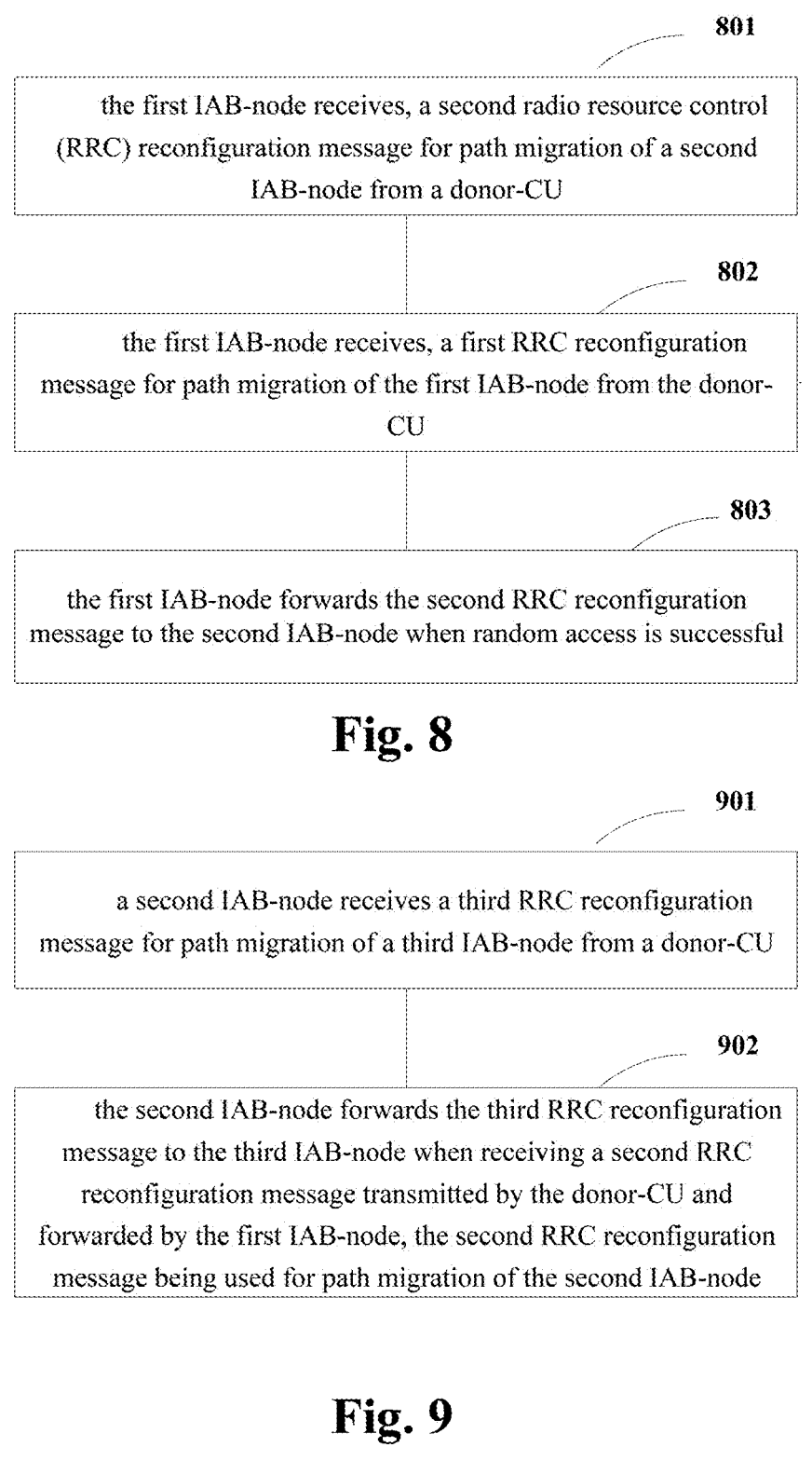

901 a second IAB-node receives a third RRC reconfiguration message for path migration of a third IAB-node from a donor-CU

902 the second IAB-node forwards the third RRC reconfiguration message to the third IAB-node when receiving a second RRC reconfiguration message transmitted by the donor-CU and forwarded by the first IAB-node, the second RRC reconfiguration message being used for path migration of the second IAB-node

Fig. 9

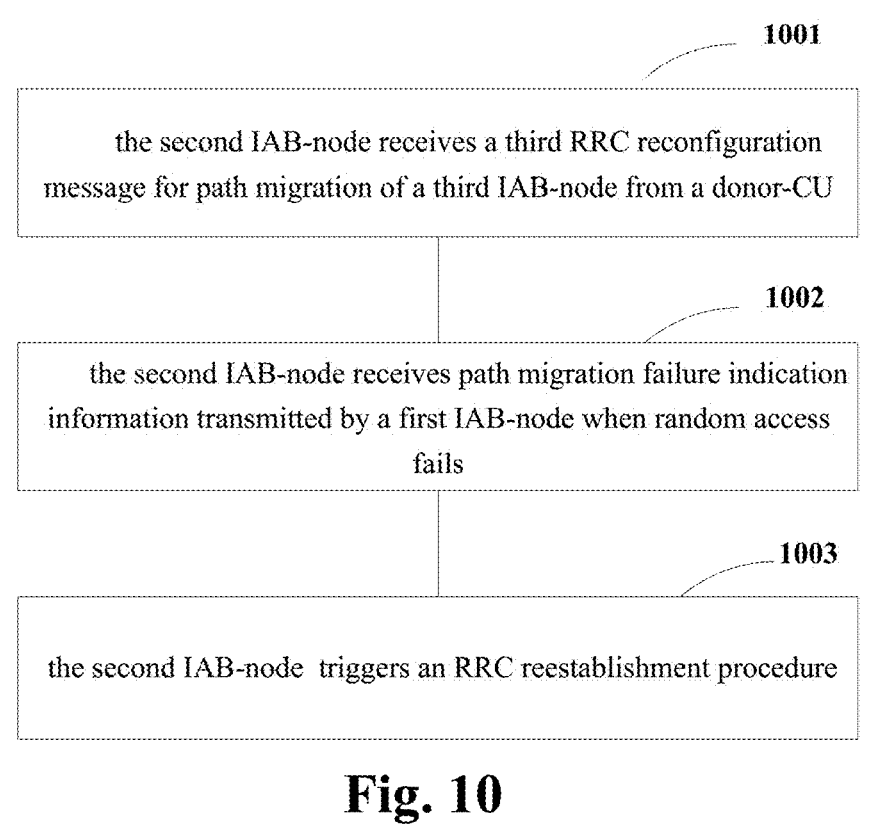

1001 the second IAB-node receives a third RRC reconfiguration
message for path migration of a third IAB-node from a donor-CU

1002 the second IAB-node receives path migration failure indication
information transmitted by a first IAB-node when random access
fails

1003 the second IAB-node  triggers an RRC reestablishment procedure

Fig. 10

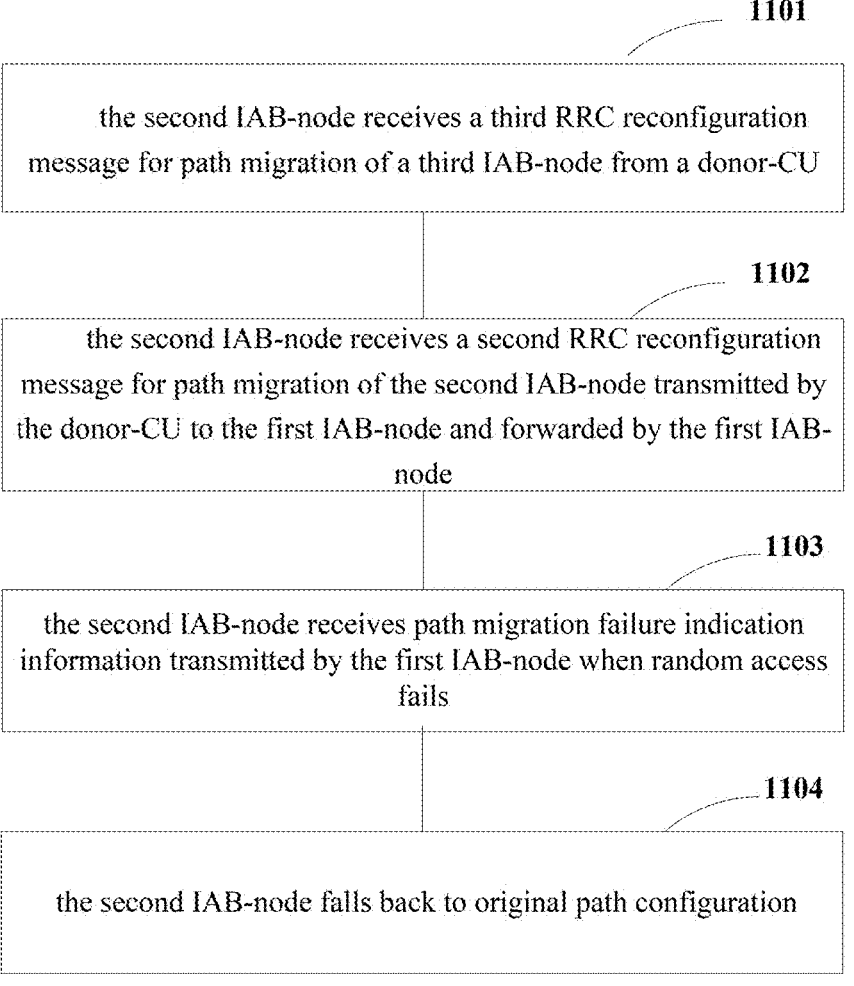

the second IAB-node receives a third RRC reconfiguration message for path migration of a third IAB-node from a donor-CU

1101 the second IAB-node receives a second RRC reconfiguration message for path migration of the second IAB-node transmitted by the donor-CU to the first IAB-node and forwarded by the first IAB-node

1102 the second IAB-node receives path migration failure indication information transmitted by the first IAB-node when random access fails

1103 the second IAB-node falls back to original path configuration

1201 a donor-CU transmits a second radio resource control (RRC) reconfiguration message for path migration of a second IAB-node to a first IAB-node, so that the first IAB-node forwards the second RRC reconfiguration message to the second IAB-node when random access is successful

1202 the donor-CU transmits a first radio resource control (RRC) reconfiguration message for path migration of the first IAB-node to the first IAB-node

1203 the donor-CU transmits a third RRC reconfiguration message for path migration of the third IAB-node to the second IAB-node

Fig. 12

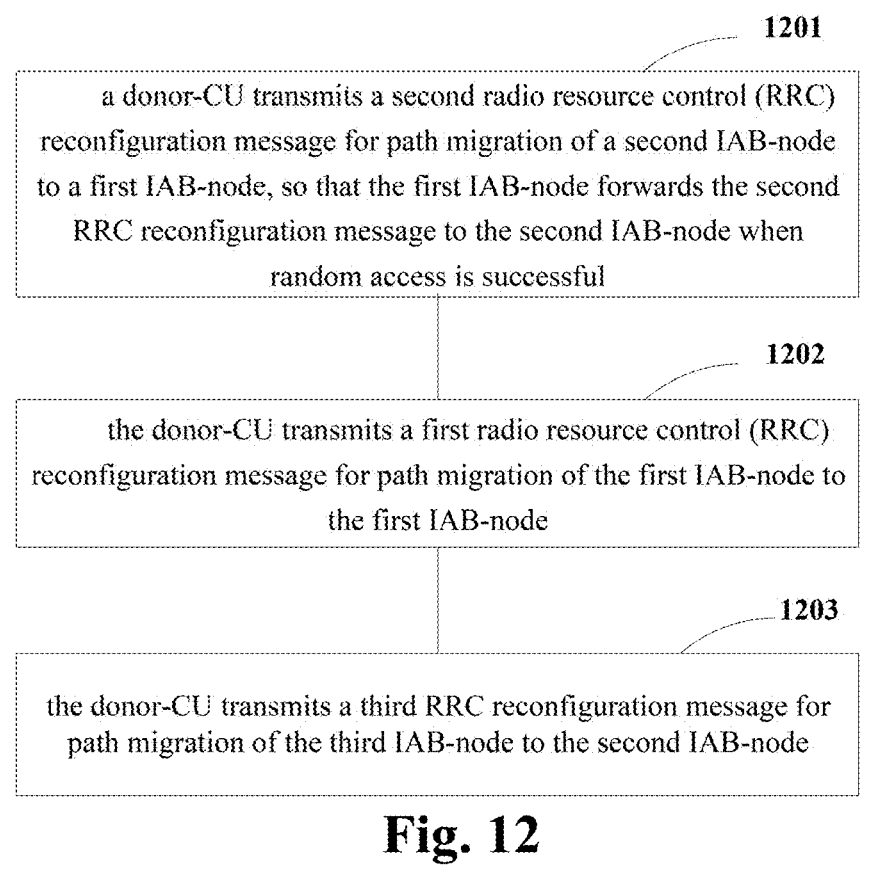

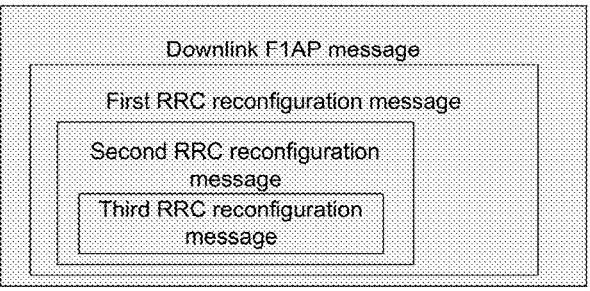
Fig. 19A
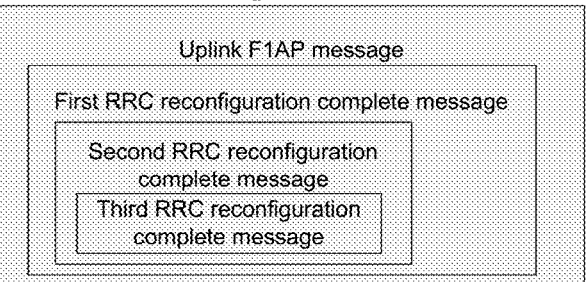
Fig. 19B
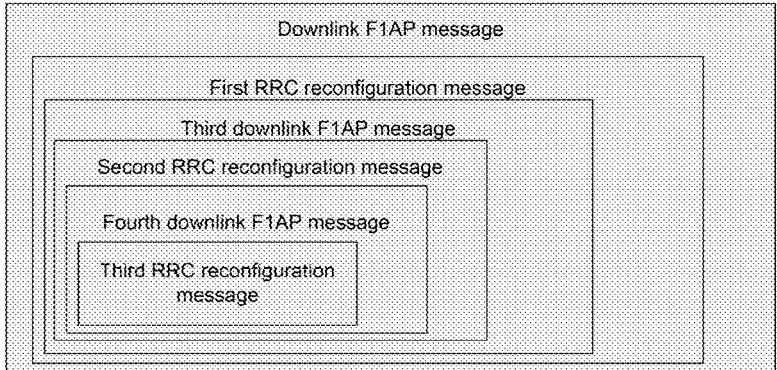
Fig. 20A
Fig. 20B

2100

2200

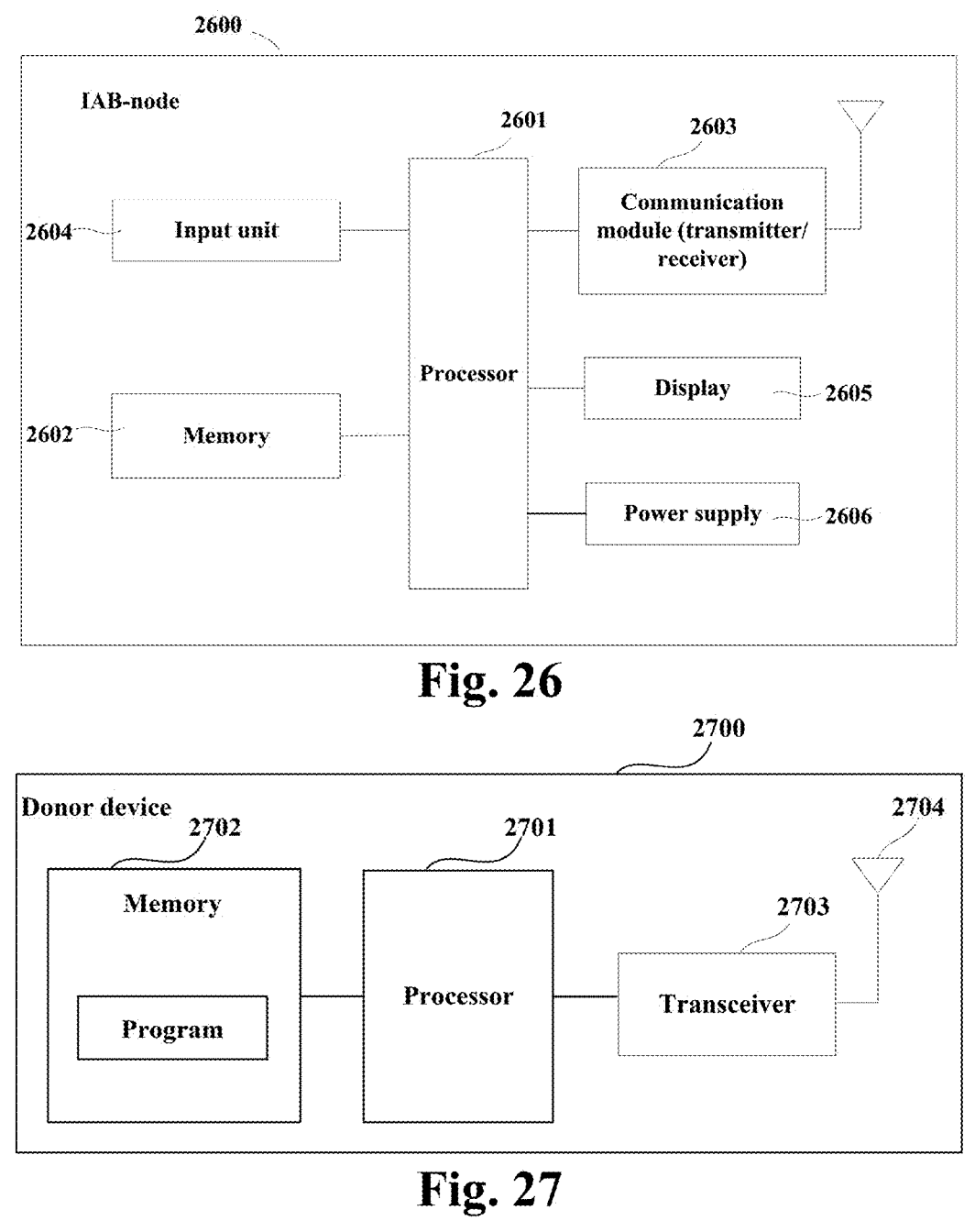

2600

IAB-node

2601

2603

2604 — Input unit

Processor

Communication module (transmitter/receiver)

2602 — Memory

Display — 2605

Power supply — 2606

Donor device

2702

Memory

2701

2704

Program

Processor

2703

Transceiver

Fig. 27

MESSAGE TRANSMISSION METHOD, APPARATUS AND SYSTEM IN INTEGRATED ACCESS AND BACKHAUL SYSTEMS

CROSS-REFERENCE TO RELATED APPLICATION

This application is a continuation application of International Application PCT/CN2021/091967 filed on May 6, 2021, and designated the U.S., the entire contents of which are incorporated herein by reference.

TECHNICAL FIELD

This disclosure relates to the field of communication technologies.

BACKGROUND

Seamless cellular network deployment in the future needs very flexible and ultra-dense NR cell deployment. The ultra-dense network is one of goals of 5G, and deployment of an NR network with no wired backhaul is very important for the realization of 5G ultra-dense network. As coverage of a cell is reduced by a 5G millimeter wave, it is further needed that a wireless self-backhauling system is of multi-hop to meet deployment requirements. High bandwidth, large-scale MIMO and beam system of 5G make it easier for 5G to develop the wireless self-backhauling system of ultra-dense NR cells than LTE. In order to develop this multi-hop system with wireless self-backhauling, 3GPP began research and standardization of an IAB (integrated access and backhaul) project in R16.

FIG. 1 is a schematic diagram of an IAB system. As shown in FIG. 1, in the IAB system, a relay node supports access and backhaul functions at the same time. A wireless transmission link of the relay node multiplexes an access link and backhaul link in the time domain, frequency domain or spatial domain. The access link and backhaul link may use identical or different frequency bands.

In an IAB network architecture, the relay node refers to an IAB-node, which supports access and backhaul functions at the same time. A last hop of access node at the network side is referred to as an IAB-donor, which supports a gNB function and supports IAB-node access. All UE data may be backhauled to the IAB-donor in one or more hops via the IAB-node.

Functions of the IAB-node are divided into two parts, one is a gNB-DU function, referred to as an IAB-DU (distribution unit), and the other is a UE function, referred to as an IAB-MT (mobile terminal). The IAB-DU realizes function at a network side device, is connected to a downstream child IAB-node, provides NR air access to the UE and the downstream child IAB-node, and establishes F1 connection with the IAB donor-CU. The IAB-MT realizes some functions of a terminal equipment and is connected to an upstream parent IAB-node or IAB-donor DU. The IAB-MT includes physical layer, layer 2, RRC and NAS layer functions, and is further indirectly connected to the IAB donor-CU and a core network (CN).

In the IAB system, the IAB-node may access to the network in a standalone (SA) mode or non-standalone (EN-DC, E-UTRA-NRDualConnectivity) mode. FIG. 2 is a schematic diagram of an IAB architecture of the SA mode. FIG. 3 is a schematic diagram of an IAB architecture of the EN-DC mode.

FIG. 4 is a schematic diagram of an IAB-node, a parent IAB-node and a child IAB-node. As shown in FIG. 4, an IAB-DU of the IAB-node is taken as a network side to connect to IAB-MT of the child IAB-node, and an IAB-MT of the IAB-node is taken as a terminal side to connect to IAB-DU of the parent IAB-node.

FIG. 5 is a schematic diagram of an F1 user interface (F1-U) protocol stack between the IAB-DU and IAB-donor CU. FIG. 6 is a schematic diagram of an F1 control plane (F1-C) protocol stack between the IAB-DU and IAB-donor CU.

As shown in FIG. 5 and FIG. 6, the F1-U and F1-C are built on a transmission (IP) layer between the IAB-DU and IAB-donor-CU. Two hops of wireless backhaul and one hop of wired backhaul are performed in FIG. 5 and FIG. 6. On the backhaul link, the transmission (IP) layer is carried on a backhaul adaptive protocol (BAP) sublayer. A BAP entity in the IAB-node executes a routing function of the IAB system, and the IAB-donor CU provides a routing table. BAP PDUs are transmitted in an RLC channel of the backhaul link, multiple RLC channels of the backhaul link may be configured by the IAB-donor to carry services of different priorities and QoS, and the BAP entity maps the BAP PDUs to different backhaul RLC channels.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY OF THE DISCLOSURE

In R16, an IAB system has supported adaptive changes in topology and routing caused by movement of the IAB-node between different DUs under the same donor-CU. When the IAB-node moves under the same donor-CU (at this moment, the IAB-node is referred to as a migrating IAB-node), a topology relation with a downstream IAB-node and a UE is still maintained. However, during the movement of the IAB-node, if it is disconnected from an original parent IAB-node and is connected to a new parent IAB-node, it results in changes in transmission paths from the IAB-node and its child node to a donor-CU, i.e. changes in a network topology, such as changes in a network topology resulted when the IAB-node is handed over to the new parent node or establishes dual connection to the new parent node.

FIG. 7 is a schematic diagram of the changes in the network topology resulted from the movement of the IAB-node. As shown in FIG. 7, after IAB-node 5 is handed over from a cell under IAB-node 3 to a cell under IAB-node 4, transmission paths from IAB-node 5 and its downstream child node IAB-node 6 to the donor-CU are changed from passing IAB-node 1 and IAB-node 2 to passing IAB-node 2 and IAB-node 4, i.e. the network topology is changed.

Currently, for a process of network topology adaptation when an IAB-node moves within the same donor-CU, when a parent node of the IAB-node is changed, the donor-CU may configure configuration information related to network topology adaptation for the IAB-node via an RRC reconfiguration message, wherein the default routing identifier includes a BAP address and path ID of a destination donor-DU. After the IAB-node is handed over to a new parent node, the IAB-node begins to apply the above configuration information. For a downstream child node of the IAB-node, configurations related to the network topology adaptation may be performed in the same method.

It was found by the inventors that in existing methods, an IAB-node handed over to a new parent node and its child node are unable to be made to simultaneously perform F1 path migration, which may result in a longer service interruption timing during a process of path migration of the IAB-node. Currently, network topology adaptation of a child node is performed after access of the IAB-node to a new parent node, and the child node performs network topology adaptation after the IAB-node. As a donor-DU (parent node) is changed after the topology adaptation, an address of an original donor-DU is carried by uplink data generated by the child node according to the original path configuration, which is different from an address of a new donor-DU. These uplink data is dropped by the new donor-DU, thereby resulting in the uplink data generated by the child node according to the original path configuration to be unable to be transmitted to a CU, and the dropped uplink data is retransmitted by the UE, thereby resulting in longer data transmission latency and service interruption timing.

Furthermore, in a process of network topology adaptation caused by movement of the IAB-node, the donor-DU needs to transmit configuration messages related to network topology adaptation to the IAB-node and each downstream child node thereof. However, a configuration message for each node need to be transmitted separately, thereby resulting in large amount of overhead of signaling messages, and also leading to longer service interruption timing.

In order to solve at least one of the above problems or other similar problems, embodiments of this disclosure provide a message transmission method and apparatus and a system.

According to an aspect of the embodiments of this disclosure, there is provided a message transmission apparatus, applicable to a first integrated access and backhaul node (IAB-node), the apparatus including:

a first receiving unit configured to receive a second radio resource control (RRC) reconfiguration message for path migration of a second IAB-node from a donor central unit (donor-CU), wherein the second IAB-node is a downstream child node of the first IAB-node;

a second receiving unit configured to receive a first RRC reconfiguration message for path migration of the first IAB-node from the donor-CU; and a first transmitting unit configured to forward the second RRC reconfiguration message to the second IAB-node when random access of the first IAB-node is successful.

According to another aspect of the embodiments of this disclosure, there is provided a message transmission apparatus, applicable to a second integrated access and backhaul node (IAB-node), the apparatus including:

a fourth receiving unit configured to receive a third RRC reconfiguration message for path migration of a third IAB-node from a donor-CU; and a third transmitting unit configured to forward the third RRC reconfiguration message to the third IAB-node when receiving a second RRC reconfiguration message transmitted by the donor-CU and forwarded by the first IAB-node, the second RRC reconfiguration message being used for path migration of the second IAB-node, wherein the third IAB-node is a downstream child node of the second IAB-node, and the second IAB-node is a downstream child node of the first IAB-node.

According to a further aspect of the embodiments of this disclosure, there is provided a message transmission apparatus, applicable to a second integrated access and backhaul node (IAB-node), the apparatus including:

a sixth receiving unit configured to receive a third RRC reconfiguration message for path migration of a third IAB-node from a donor-CU;

a seventh receiving unit configured to receive path migration failure indication information transmitted by a first IAB-node when random access fails; and a second processing unit configured to trigger an RRC reestablishment procedure or fall back to original path configuration, wherein the third IAB-node is a downstream child node of the second IAB-node, and the second IAB-node is a downstream child node of the first IAB-node.

An advantage of the embodiments of this disclosure exists in that before the IAB-node is handed over to a new parent node, information related to network topology adaptation configured for its child node is transmitted by the donor-DU to the IAB-node and buffered in the IAB-node. When random access of the IAB-node to the new parent node is successful, the IAB-node forwards the information related to network topology adaptation configured by the donor-DU for its child node to its child node. Hence, the IAB-node and its child node may be made to almost simultaneously perform network topology adaptation, thereby reducing service interruption timing resulted from node migration.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiments of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings:

FIG. 1 is schematic diagram of an IAB system;

FIG. 2 is a schematic diagram of an IAB architecture in an SA mode;

FIG. 3 is a schematic diagram of an IAB architecture in an EN-DC mode;

FIG. 8 is a schematic diagram of the message transmission method of an embodiment of this disclosure;

FIG. 9 is a schematic diagram of the message transmission method of an embodiment of this disclosure;

FIG. 10 is a schematic diagram of the message transmission method of an embodiment of this disclosure;

FIG. 11 is a schematic diagram of the message transmission method of an embodiment of this disclosure;

FIG. 12 is a schematic diagram of the message transmission method of an embodiment of this disclosure;

FIG. 19A is a schematic diagram of a structure of a downlink message of an embodiment of this disclosure;

FIG. 19B is a schematic diagram of a structure of an uplink message of an embodiment of this disclosure;

FIG. 20A is a schematic diagram of a structure of a downlink message of an embodiment of this disclosure;

FIG. 20B is a schematic diagram of a structure of an uplink message of an embodiment of this disclosure;

FIG. 26 is a schematic diagram of the IAB-node of an embodiment of this disclosure; and FIG. 27 is a schematic diagram of the donor device of an embodiment of this disclosure.

DETAILED DESCRIPTION OF THE DISCLOSURE

Figures 4, 5:
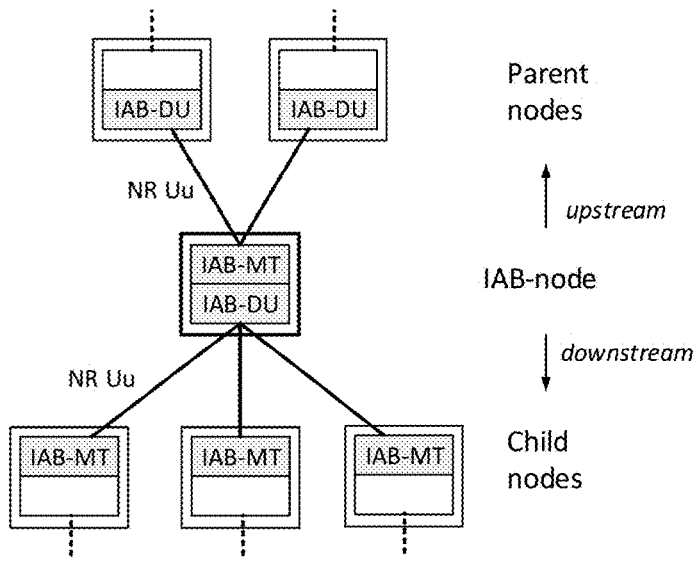
FIG. 4 is a schematic diagram of a parent IAB-node and a child IAB-node.
FIG. 5 is a schematic diagram of an F1-U protocol stack of the IAB system.
Figure 6:
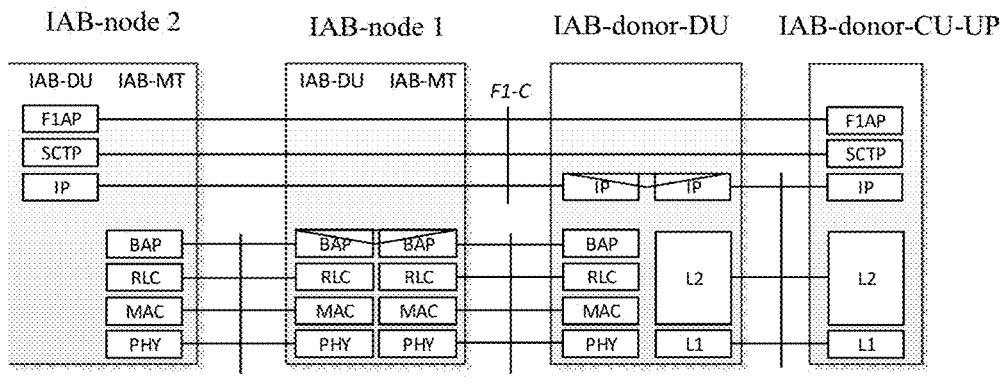
FIG. 6 is a schematic diagram of an F1-C protocol stack of the IAB system.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and 6G in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Figure 7:
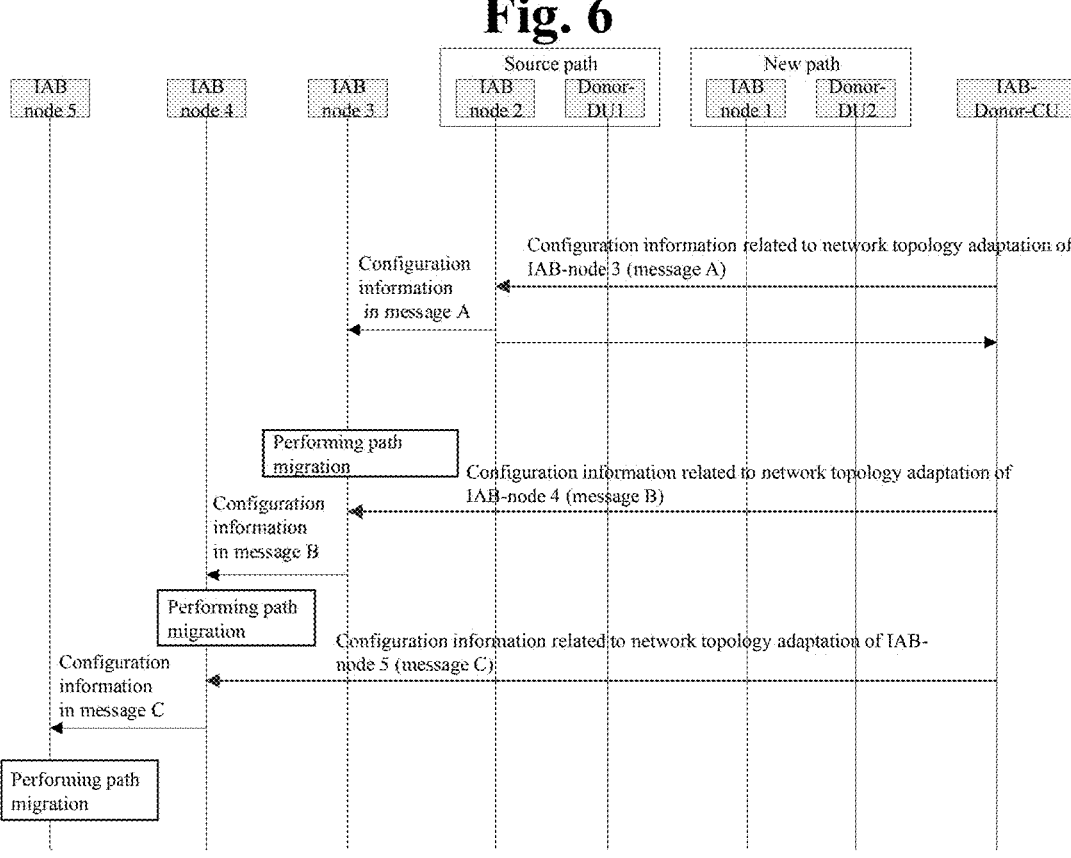
FIG. 7 is a schematic diagram of movement of an IAB between different DUs of the same donor.

For example, in FIG. 7, IAB-node 3 is a parent node of IAB-node 4, and IAB-node 4 is a parent node of IAB-node 5. After IAB-node 3 is handed over to a new parent node IAB-node 2, network topology is changed, that is, transmission paths between IAB-node 3, IAB-node 4, IAB-node 5 and the donor-CU are changed. The donor-CU transmits configuration messages related to network topology adaptation to IAB-node 3, IAB-node 4 and IAB-node 5, so that F1 transmission paths are handed over from original paths to new paths. The network topology adaptation for IAB-node 4 and IAB-node 5 is performed after access of IAB-node 3 to the new parent node is completed, that is, network topology adaptation of IAB-node 4 and IAB-node 5 are performed after IAB-node 3. Hence, it causes uplink data transmitted by IAB-node 4 and IAB-node 5 according to original configurations to be dropped by donor-DU 2, thereby resulting in longer transmission latency and service interruption timing.

In addition, in existing techniques, the donor-CU transmits a downlink F1AP (F1 application protocol) message carrying configuration information related to the network topology adaptation respectively for IAB-node 3 and each of its child node, i.e. transmitting DL F1AP MESSAGE to IAB-node 3 and respective parent nodes of its child node (see messages A, B and C in FIG. 7). For message B, it can only be transmitted after path migration of IAB-node 3 is successful, and for message C, it can only be transmitted after path migration of IAB-node 4 is successful, which results in large amount of signaling message overhead and a longer service interruption timing.

In this disclosure, before the IAB-node is handed over to a new parent node, the information related to the network topology adaptation configured for its child node is transmitted by the donor-CU to the IAB-node and buffered in the IAB-node. When random access of the new parent node to which the IAB-node is handed over is successful, the IAB-node forwards the information related to the network topology adaptation configured by the donor-CU to its child node. Hence, IAB-nodes and its child node may be made to almost simultaneously perform network topology adaptation, thereby reducing service interruption timing resulted from node migration.

This disclosure shall be described by taking that an IAB-node is handed over to a new parent node as an example; however, the embodiments of this disclosure are not limited thereto, and this disclosure is also applicable to changes in a network topology caused by establishment of dual-connection between the IAB-node and the new parent node. The embodiments of this disclosure shall be described below with reference to the accompanying drawings. These embodiments are illustrative only, and are not intended to limit this disclosure.

For example, in the embodiments of this disclosure, a first IAB-node is taken as a migration node (such as IAB-node 3 in FIG. 7) and is an IAB-node under control of a donor-CU. The first IAB-node is migrated (handed over) from a first parent node (such as IAB-node 1 in FIG. 7) to a second parent node (such as IAB-node 2 in FIG. 7). A second IAB-node (such as IAB-node 4 in FIG. 7) is a downstream child node of the first IAB-node, and a third IAB-node (such as IAB-node 5 in FIG. 7) is a downstream child node of the second IAB-node. It should be noted that the number of the second IAB-node or third IAB-node may be one or at least two, and the third IAB-node may also have other child node, and the embodiments of this disclosure is not limited thereto. For the convenience of explanation, following description shall be given by taking that IAB-node 4 in FIG. 7 is taken as the second IAB-node, IAB-node 5 is taken as the third IAB-node and IAB-node 5 has no other child node as examples.

Embodiments of a First Aspect

The embodiments of this disclosure provide a message transmission method, which shall be described from a first IAB-node side.

The method is applicable to a case where the first IAB-node and its child node perform path migration due to the first IAB-node to be handed over to a new parent node. FIG. 8 is a schematic diagram of the message transmission method of this embodiment. As shown in FIG. 8, the method includes:

801: the first IAB-node receives, a second radio resource control (RRC) reconfiguration message for path migration of a second IAB-node from a donor-CU; 802: the first IAB-node receives, a first RRC reconfiguration message for path migration of the first IAB-node from the donor-CU; and

803: the first IAB-node forwards the second RRC reconfiguration message to the second IAB-node when random access is successful.

In some embodiments, both the first RRC reconfiguration message and the second RRC reconfiguration message in 801 and 802 are configured and generated by the donor-CU. The first or second RRC reconfiguration message from the donor-CU may be directly transmitted by the donor-CU to the first IAB-node, or may be transmitted by the donor-CU to the first parent node and forwarded by the first parent node to the first IAB-node, and the embodiments of this disclosure is not limited thereto.

In some embodiments, in 803, the first IAB-node determines that the second RRC reconfiguration message is forwarded to the second IAB-node only when the first RRC reconfiguration message is used for path migration of the first IAB-node. When the first RRC reconfiguration message contains a first parameter configured for the first IAB-node to change a transmission path, the first IAB-node may determine that the first RRC reconfiguration message is used for path migration of the first IAB-node. The first parameter includes a default backhaul radio link control (BH RLC) channel, or a default backhaul adaptation protocol (BAP) route, or an Internet protocol (IP) address, configured for the first IAB-node. The default BH RLC channel may be a BH RLC channel used by uplink F1-C and non-F1 data, the default BAP route may be a route used by the uplink F1-C and non-F1 data, including a path identifier and a destination BAP address, and the IP address denotes an IP address routable to a new donor-DU (such as donor-DU 2 in FIG. 7) handed over to a second parent node. When the first IAB-node receives the first RRC reconfiguration message containing the first parameter, it determines that the first RRC reconfiguration message is a configuration message for path migration.

In some embodiments, the first IAB-node determines that the first RRC reconfiguration message is a configuration message for path migration according to that the first RRC reconfiguration message includes first path migration indication information. In the case where the first RRC reconfiguration message contains the parameter for changing transmission path configuration, the RRC message may possibly not be used for path migration, hence, it is needed to explicitly indicate RRC reconfiguration related to path migration to the first IAB-node, wherein the first path migration indication information is used to indicate that the first RRC reconfiguration message is a reconfiguration message used by the first IAB-node for performing path migration.

In some embodiments, this method is applicable to a case where the first IAB-node performs path migration between different donor-DUs (the donor-DUs are changed after handover to the new parent node), the first RRC reconfiguration message is used by the first IAB-node for path migration between the donor-DUs. The first path migration indication information is used to indicate that the first IAB-node is performing path migration between donor-DUs, that is, that the first RRC message contains the first path migration indication information indicates that the first RRC reconfiguration message is a reconfiguration message used by the first IAB-node for performing path migration between different donor-DUs.

In some embodiments, in 801 and 802, the first RRC reconfiguration message and the second RRC reconfiguration message may be carried by a downlink message, that is, the first IAB-node receives the first RRC reconfiguration message and the second RRC reconfiguration message at the same time, or the first RRC reconfiguration message and the second RRC reconfiguration message may be carried respectively by two downlink messages, that is, the first IAB-node receives the second RRC reconfiguration message and the first RRC reconfiguration message successively, which shall be explained later in detail.

In some embodiments, in 803, the first IAB-node is handed over to the second parent node and performs path migration, wherein the first IAB-node needs to perform random access so as to be handed over to the second parent node, and the first RRC reconfiguration message contains information related to that the first IAB-node is handed over to the second parent node. Reference may be made to random access of an IAB-node in existing techniques for the random access process, which shall not be repeated herein any further. Forwarding the buffered second RRC reconfiguration message is triggered only when the random access is successful. When the random access fails, the first IAB-node triggers RRC reestablishment, and reference may be made to RRC reestablishment of an IAB-node in existing techniques for a process of RRC reestablishment, which shall not be repeated herein any further. Furthermore, the first IAB-node needs to transmit path migration failure indication information to its child node, and optionally, the second RRC reconfiguration message may also be forwarded to its child node or the second RRC reconfiguration message may also be cleared. Specific behaviors of its child node when the random access fails shall be explained later in the embodiments of a second aspect.

In some embodiments, in 803, when the random access is successful, the method may further include: the first IAB-node transmits a first RRC reconfiguration complete message to the donor-CU. In addition, the first IAB-node may also receive second RRC reconfiguration complete message transmitted by the second IAB-node. Optionally, the second RRC reconfiguration complete message may be forwarded to the donor-CU, wherein the first RRC reconfiguration complete message and the second RRC reconfiguration complete message may be carried by one uplink message, or may be carried respectively by two or more uplink messages. The transmitting to the donor-CU may be transmitting to the donor-CU directly, or may be forwarding to the donor-CU via the second parent node, which shall be explained later in detail.

Hence, before the IAB-node is handed over to the new parent node, the information related to network topology adaptation configured for its child node is transmitted by the donor-CU to the IAB-node and buffered in the IAB-node. When the random access of the IAB-node to the new parent node to which it is handed over is successful, the IAB-node forwards the information related to network topology adaptation configured by the donor-CU for its child node to its child node. Hence, the IAB-node and its child node may be made to almost simultaneously perform network topology adaptation, thereby reducing service interruption timing resulted from node migration.

Embodiments of a Second Aspect

The embodiments of this disclosure provide a message transmission method, which shall be described from a second IAB-node side. Behaviors at a third IAB-node side are similar to those at the second IAB-node side, which shall not be enumerated herein any further.

In some embodiments, the second IAB-node receives a third RRC reconfiguration message for path migration of the third IAB-node from a donor-CU.

In some embodiments, the third RRC reconfiguration message is configured and generated by the donor-CU, and the third RRC reconfiguration message from the donor-CU may be directly transmitted by the donor-CU to the second IAB-node, or may be transmitted by the donor-CU to a first IAB-node and forwarded by the first IAB-node to the second IAB-node, or may be transmitted by the donor-CU to a first parent node and forwarded by the first parent node to the first IAB-node, and then forwarded by the first IAB-node to the second IAB-node; however, the embodiments of this disclosure is not limited thereto.

In some embodiments, when the random access of the first IAB-node is successful (the random access is completed), the second IAB-node receives the second RRC reconfiguration message forwarded by the first IAB-node, and forwards the third RRC reconfiguration message to the third IAB-node when receiving the second RRC reconfiguration message; and when the random access of the first IAB-node fails (which may also be regarded as that the random access is not completed or is unable to be completed correctly), the second IAB-node receives the path migration failure indication information transmitted by the first IAB-node, and triggers an RRC reestablishment procedure or falls back to original path configuration, which shall be described below respectively.

FIG. 9 is a schematic diagram of the message transmission method at the second IAB-node side when the random access of the first IAB-node is successful. As shown in FIG. 9, the method includes:

901: a second IAB-node receives a third RRC reconfiguration message for path migration of a third IAB-node from a donor-CU; and

902: the second IAB-node forwards the third RRC reconfiguration message to the third IAB-node when receiving a second RRC reconfiguration message transmitted by the donor-CU and forwarded by the first IAB-node, the second RRC reconfiguration message being used for path migration of the second IAB-node.

In some embodiments, before 902, the method may further include (not shown in figures): the second IAB-node receives the second RRC reconfiguration message transmitted by the donor-CU and forwarded by the first IAB-node. Implementation of the second RRC reconfiguration message is as described above, which shall not be repeated herein any further. The second RRC reconfiguration message and the third RRC reconfiguration message may be carried by one downlink message, or may be carried respectively by two downlink messages, which shall be described later in detail.

In some embodiments, in 902, when receiving the second RRC reconfiguration message, the second IAB-node performs path migration, and at the same time, triggers the second IAB-node to forward the buffered third RRC reconfiguration message to the third IAB-node. As the second IAB-node does not change the parent node (the parent node is still the first IAB-node), the second RRC reconfiguration message does not contain handover information, and the second IAB-node does not need to perform a random access procedure.

In some embodiments, in 902, the second IAB-node forwards the third RRC reconfiguration message to the third IAB-node when it determines that the second RRC reconfiguration message is a configuration message for the path migration of the second IAB-node. The second RRC reconfiguration message may be determined to be used for the path migration of the second IAB-node in following two ways, for example, the second RRC reconfiguration message contains a second parameter for changing transmission path configuration for the second IAB-node, or the second RRC reconfiguration message contains second path migration indication information. Implementations of the second parameter and the second path migration indication information are identical to the implementations of the first parameter and the first path migration indication information, which shall not be repeated herein any further.

Furthermore, when the second RRC reconfiguration message is received, the method may further include (not shown in figures): the second IAB-node transmits a second RRC reconfiguration complete message to the first IAB-node; and the second IAB-node receives the third RRC reconfiguration complete message transmitted by the third IAB-node. Optionally, the third RRC reconfiguration complete message may also be forwarded to the donor-CU, wherein the second RRC reconfiguration complete message and the third RRC reconfiguration complete message may be carried by one uplink message, or may be carried respectively by two uplink messages. The transmitting to the donor-CU may be directly transmitting to the donor-CU, or may be forwarding to the donor-CU via the first IAB-node and/or the second parent node, which shall respectively be described later.

Hence, before the IAB-node is handed over to the new parent node, the information related to network topology adaptation configured for its child node is transmitted by the donor-CU to the IAB-node and buffered in the IAB-node. When the random access of the IAB-node to the new parent node to which it is handed over is successful, the IAB-node forwards the information related to network topology adaptation configured by the donor-CU for its child node to its child node. When receiving the information, the child node forwards information related to network topology adaptation configured by the donor-CU for its child node to its child node. Hence, the IAB-node and its child node may almost simultaneously perform network topology adaptation, thereby reducing service interruption timing resulted from node migration.

FIG. 10 is a schematic diagram of the message transmission method at the second IAB-node side when the random access of the first IAB-node fails. As shown in FIG. 10, the method includes:

1001: the second IAB-node receives a third RRC reconfiguration message for path migration of a third IAB-node from a donor-CU;

1002: the second IAB-node receives path migration failure indication information transmitted by a first IAB-node when random access fails; and

1003: the second IAB-node triggers an RRC reestablishment procedure.

In some embodiments, implementations of 1001 are as described above, which shall not be repeated herein any further.

In some embodiments, in 1002, if a T304 timer expires, it indicates that the random access of the first IAB-node fails (which may also be regarded as that the random access is not completed or is unable to be completed or is unable to be completed correctly). The first IAB-node transmits path migration failure indication information to the second IAB-node, so that the second IAB-node performs the RRC reestablishment procedure. The first IAB-node may also forward the second RRC reconfiguration message to the second IAB-node or clear the second RRC reconfiguration message. Correspondingly, in 1002, the method may further include: the second IAB-node receives the second RRC reconfiguration message for path migration of the second IAB-node transmitted by the donor-CU to the first IAB-node and forwarded by the first IAB-node.

In some embodiments, the method may further include (not shown in figures): the second IAB-node forwards the path migration failure indication information received in 1002 to the third IAB-node, so as to trigger the third IAB-node to perform RRC reestablishment.

In some embodiments, the method may further include (not shown in figures): the second IAB-node forwards the third RRC reconfiguration message to the third IAB-node, or clears the third RRC reconfiguration message. Reference may be made to the first IAB-node side for a particular implementation, which shall not be repeated herein any further.

In some embodiments, in 1003, the second IAB-node triggers the RRC reestablishment procedure, and reference may be made to RRC reestablishment of an IAB-node in existing techniques for the RRC reestablishment procedure, which shall not be repeated herein any further.

Hence, when the random access of the IAB-node to the new parent node to which it is handed over fails, it triggers RRC reestablishment and indicates the path migration failure to its child node, and at the same time, its child node also triggers RRC reestablishment. Thus, when migration of the IAB-node fails, the IAB-node and its child node may almost simultaneously perform RRC reestablishment, thereby reducing service interruption timing resulted from path migration failure.

FIG. 11 is another schematic diagram of the message transmission method at the second IAB-node side when the random access of the first IAB-node fails. As shown in FIG. 11, the method includes:

1101: the second IAB-node receives a third RRC reconfiguration message for path migration of a third IAB-node from a donor-CU;

1102: the second IAB-node receives a second RRC reconfiguration message for path migration of the second IAB-node transmitted by the donor-CU to the first IAB-node and forwarded by the first IAB-node;

1103: the second IAB-node receives path migration failure indication information transmitted by the first IAB-node when random access fails; and

1104: the second IAB-node falls back to original path configuration.

In some embodiments, implementations of 1101 and 1103 are as described above, which shall not be repeated herein any further.

In some embodiments, the first IAB-node transmits the path migration failure indication information and the second RRC reconfiguration message to the second IAB-node, so that the second IAB-node falls back to the original path configuration. What is different from those in FIG. 10 is that the second IAB-node does not perform RRC reestablishment, that is, although the second RRC reconfiguration message is received, the reconfiguration is not performed, and falling back to the original path configuration is only performed. Hence, the first IAB-node does not optionally forward the second RRC reconfiguration message to the second IAB-node, but it necessarily forwards the second RRC reconfiguration message, that is, 1102 is a necessary step; otherwise, a packet data aggregation protocol (PDCP) of the second IAB-node may be abnormal since the second RRC reconfiguration message is not received.

In some embodiments, the method may further include (not shown in figures): the second IAB-node forwards the third RRC reconfiguration message to the third IAB-node, and the second IAB-node forwards the path migration failure indication information received in 1103 to the third IAB-node, so that the third IAB-node falls back to the original path configuration. Reference may be made to the first IAB-node side for a particular implementation, which shall not be repeated herein any further.

Hence, when the random access fails when the IAB-node hands over to the new parent node, it triggers RRC reestablishment, forwards the RRC reconfiguration of its child node to the child node and indicates path migration failure to the child node, so that the child node falls back to the original path configuration. Thus, when the IAB-node fails in migration, the IAB-node and its child node may simultaneously fall back to the original path configuration; otherwise, if the child node performs path migration and generates uplink data according to the new path configuration, these uplink data is dropped and retransmitted by a UE, thereby resulting in an increase in uplink data transmission latency. This method may avoid prolonged data transmission time caused by path migration failure.

Embodiments of a Third Aspect

The embodiments of this disclosure provide a message transmission method, which shall be described from a donor-CU side.

FIG. 12 is a schematic diagram of the message transmission method. As shown in FIG. 12, the method includes:

1201: a donor-CU transmits a second radio resource control (RRC) reconfiguration message for path migration of a second IAB-node to a first IAB-node, so that the first IAB-node forwards the second RRC reconfiguration message to the second IAB-node when random access is successful; and

1202: the donor-CU transmits a first radio resource control (RRC) reconfiguration message for path migration of the first IAB-node to the first IAB-node.

In some embodiments, the method may further include:

1203: the donor-CU transmits a third RRC reconfiguration message for path migration of the third IAB-node to the second IAB-node.

In some embodiments, the donor-CU generates the first RRC reconfiguration message, the second RRC reconfiguration message and the third RRC reconfiguration message, and reference may be made to embodiments of the first aspect and the second aspect for contents, structures and implementations of carrying of the first RRC reconfiguration message, the second RRC reconfiguration message and the third RRC reconfiguration message. For example, in 1201-1203, the first RRC reconfiguration message, the second RRC reconfiguration message and the third RRC reconfiguration message may be carried by one downlink message, that is, the donor-CU simultaneously transmits the first RRC reconfiguration message, the second RRC reconfiguration message and the third RRC reconfiguration message, or the first RRC reconfiguration message, the second RRC reconfiguration message and the third RRC reconfiguration message are respectively carried by three downlink messages, that is, the donor-CU transmits the third RRC reconfiguration message, the second RRC reconfiguration message and the first RRC reconfiguration message successively, which shall respectively be described later in detail.

In some embodiments, the donor-CU transmits to the first IAB-node may be directly transmitting to the first IAB-node without passing any other relay node, or may be forwarding to the first IAB-node via the first parent node, and the donor-CU transmits to the second IAB-node may be directly transmitting to the second IAB-node without passing any other relay node, or may be forwarding to the first IAB-node via the first parent node, and forwarding by the first IAB-node to the second IAB-node side, and the embodiments are not limited thereto.

In some embodiments, the method may further include:

1204: the donor-CU receives a first RRC reconfiguration complete message from the first IAB-node. Optionally, the donor-CU may further receive a second RRC reconfiguration complete message from the second IAB-node, and receive a third RRC reconfiguration complete message from the third IAB-node. Reference may be made to embodiments of the first aspect and the second aspect for contents, structures and implementations of carrying of the first RRC reconfiguration complete message, the second RRC reconfiguration complete message and the third RRC reconfiguration complete message. For example, the first RRC reconfiguration complete message, the second RRC reconfiguration complete message and the third RRC reconfiguration complete message may be carried by one uplink message, that is, the donor-CU simultaneously transmits the first RRC reconfiguration complete message, the second RRC reconfiguration complete message and the third RRC reconfiguration complete message, or the first RRC reconfiguration complete message, the second RRC reconfiguration complete message and the third RRC reconfiguration complete message are respectively carried by three downlink messages, that is, the donor-CU transmits the third RRC reconfiguration complete message, the second RRC reconfiguration complete message and the first RRC reconfiguration complete message successively. The donor-CU may receive an RRC reconfiguration complete message transmitted directly by the first IAB-node or the second IAB-node or the third IAB-node, or may receive an RRC reconfiguration complete message transmitted by the first IAB-node or the second IAB-node or the third IAB-node and forwarded by a node, which shall respectively be described later in detail.

The message transmission methods of this disclosure are described above with reference to the embodiments of the first aspect to the third aspect. In order to make the methods of the embodiments of this disclosure clearer and easier to be understood, the methods of the embodiments of this disclosure shall be described below with reference to a process of information exchange.

As described above, the first RRC reconfiguration message and the second RRC reconfiguration message may be carried by one downlink message or two downlink messages respectively, which shall be described below.

Implementation scenario 1: the above RRC reconfiguration message is carried respectively by two downlink messages, and a difference from an existing method is that signaling carrying the second RRC reconfiguration message is transmitted before signaling carrying the first RRC reconfiguration message. Hence, the first IAB-node receives the first RRC reconfiguration message and before the first IAB-node is handed over to the second parent node, the RRC reconfiguration message transmitted by donor-CU for its child node has been transmitted to the first IAB-node and, the RRC reconfiguration message is buffered by the first IAB-node and is forwarded when the first IAB-node is handed over to the second parent node, thereby the first IAB-node and its child node may perform network topology adaptation simultaneously.

Figure 13:
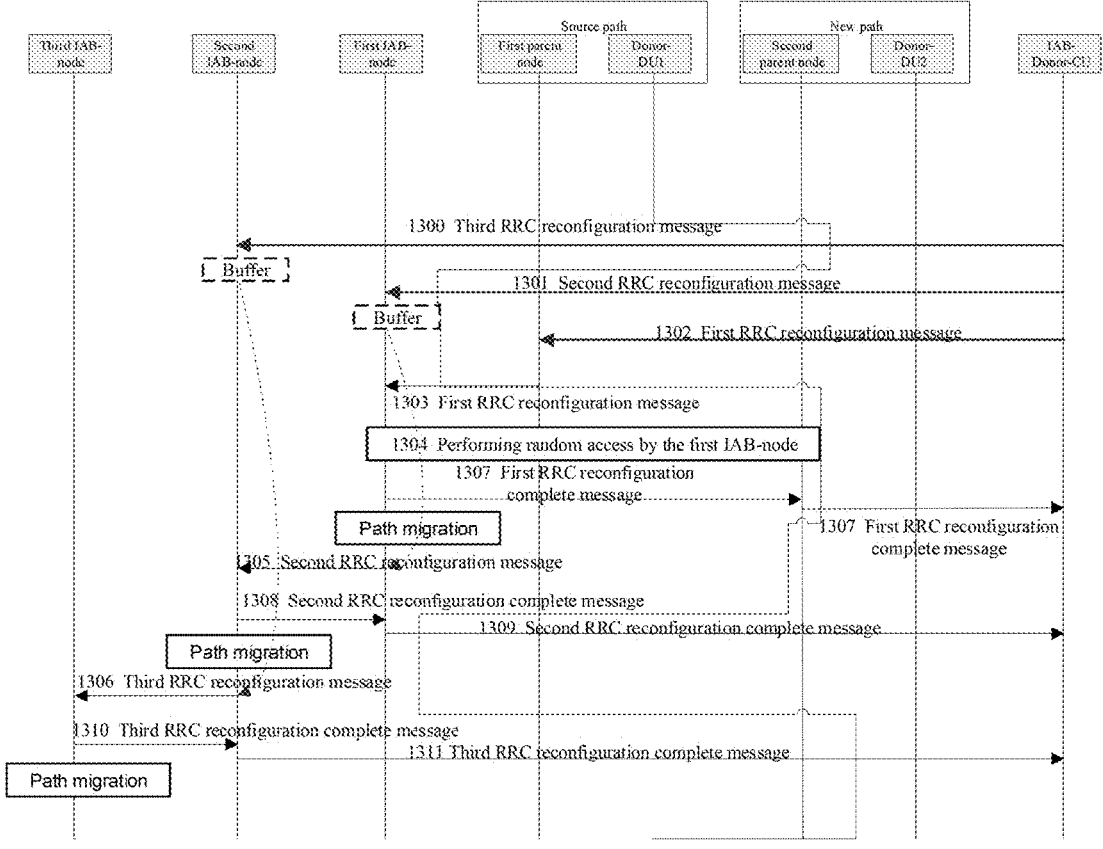
FIGS. 13-15 are schematic diagrams of a scenario of the message transmission method of the embodiment of this disclosure.

FIG. 13 is a schematic diagram of the message transmission method. As shown in FIG. 13, the method includes:

1301: a donor-CU transmits a second radio resource control (RRC) reconfiguration message for path migration of the second IAB-node to the first IAB-node;

1302: the donor-CU transmits a first radio resource control (RRC) reconfiguration message for path migration of the first IAB-node to the first parent node;

1303: the first parent node forwards the first RRC reconfiguration message to the first IAB-node;

1304: the first IAB-node performs random access to the second parent node; and

1305: when the random access is successful, the first IAB-node forwards the second RRC reconfiguration message to the second IAB-node.

Optionally, when the second IAB-node has a child node, i.e. a third IAB-node, the method may further include:

1300: a donor-CU transmits a third RRC reconfiguration message for path migration of the third IAB-node to the second IAB-node; and

1306: when the second IAB-node receives the second RRC reconfiguration message, the second IAB-node forwards the third RRC reconfiguration message to the third IAB-node.

In some embodiments, in 1301, the second RRC reconfiguration message is carried by a first downlink F1AP message, and a distribution unit (DU) of the first IAB-node receives the first downlink F1AP message transmitted by the donor-CU, thereby receiving the second RRC reconfiguration message carried by the first downlink F1AP message. For example, the first downlink F1AP message further includes first buffer indication information. The first buffer indication information is used to instruct the first IAB-node to buffer the second RRC reconfiguration message and release it until the first indication information (which will be described later) is received. As an example, the first downlink F1AP message may be a UE context modification request message.

In some embodiments, in 1302-1303, the first RRC reconfiguration message is carried by a downlink F1AP message transmitted by the donor-CU to the first parent node, and the first parent node forwards the first RRC reconfiguration message in the downlink F1AP message to the first IAB-node. As an example, the F1AP message may be a UE context modification request message. The downlink F1AP message may further include a first context identifier of the UE, and reference may be made to existing techniques for details, which shall not be elaborated herein any further.

In some embodiments, the first IAB-node performs a random access process in 1304, and reference may be made to existing techniques for an implementation thereof, which shall not be repeated herein any further. When the random access is successful, that is, after an MT (MAC layer) of the first IAB-node completes the random access to the second parent node, in 1305, the first IAB-node forwards the second RRC reconfiguration message to the second IAB-node. Specifically, when random access of the mobile terminal (MT) of the first IAB-node is successful, it transmits the first indication information to the distribution unit (DU) of the first IAB-node; and when the distribution unit (DU) of the first IAB-node receives the first indication information, it forwards the second RRC reconfiguration message to the second IAB-node. When the first RRC reconfiguration message contains a first parameter configured for the first IAB-node to change a transmission path and/or contains first path migration indication information, it indicates that the first RRC reconfiguration message is used for path migration of the first IAB-node. The MT of the first IAB-node transmits first indication information to the DU of the first IAB-node, and reference may be made to the embodiments of the first aspect for meaning(s) of the first parameter and/or the first path migration indication information, which shall not be repeated herein any further.

In some embodiments, the first RRC reconfiguration message further includes configuration information of the first indication information, the configuration information of the first indication information being used to instruct the MT of the first IAB-node to transmit the first indication information to the distribution unit (DU) of the first IAB-node when the random access is successful. When the first RRC reconfiguration message contains the configuration information of the first indication information, the MT of the first IAB-node transmits the first indication information to the DU of the first IAB-node; or, when the first RRC reconfiguration message contains the first parameter and/or the first path migration indication information and the configuration information containing the first indication information, the MT of the first IAB-node transmits the first indication information to the DU of the first IAB-node.

In some embodiments, when the first downlink F1AP message further includes the above first buffer indication information, in 1305, the DU of the first IAB-node forwards the second RRC reconfiguration message to the second IAB-node when receiving the first indication information.

The above-described first indication information, configuration information of the first indication information, first buffer indication information and the first path migration indication information may be information elements (IEs) newly added in a message, and values thereof may be default values; however, the embodiments of this disclosure are not limited thereto.

In some embodiments, in 1300, in some embodiments, in 1301, the third RRC reconfiguration message is carried by a second downlink F1AP message, and a distribution unit (DU) of the second IAB-node receives the second downlink F1AP message transmitted by the donor-CU, thereby receiving the third RRC reconfiguration message carried by the second downlink F1AP message. For example, the second downlink F1AP message further includes second buffer indication information, the second buffer indication information being used to instruct the second IAB-node to buffer the third RRC reconfiguration message and release it until the second indication information (which is described above) is received.

In some embodiments, when the second IAB-node receives the second RRC reconfiguration message forwarded by the first IAB-node in 1306, the second IAB-node forwards the third RRC reconfiguration message to the third IAB-node. Specifically, when the mobile terminal (MT) of the second IAB-node receives the second RRC reconfiguration message, it transmits the second indication information to the distribution unit (DU) of the second IAB-node, and when the distribution unit (DU) of the second IAB-node receives the second indication information, it forwards the third RRC reconfiguration message to the third IAB-node. When the second RRC reconfiguration message contains a second parameter configured for the second IAB-node to change a transmission path and/or contains second path migration indication information, it indicates that the second RRC reconfiguration message is used for path migration of the second IAB-node, and the MT of the second IAB-node transmits second indication information to the DU of the second IAB-node. Reference may be made to the embodiments of the second aspect for meaning(s) of the second parameter and/or the second path migration indication information, and reference may be made to the embodiments of the second aspect for a structure and content of the third RRC reconfiguration message, which shall not be repeated herein any further.

In some embodiments, the second RRC reconfiguration message further includes configuration information of the second indication information, the configuration information of the second indication information being used to indicate that the second IAB-node may transmit the second indication information to the distribution unit (DU) of the second IAB-node when receiving the second RRC reconfiguration message. When the second RRC reconfiguration message contains the configuration information of the second indication information, the MT of the second IAB-node transmits the second indication information to the DU of the second IAB-node; or, when the second RRC reconfiguration message contains the second parameter and/or the second path migration indication information and the configuration information containing the second indication information, the MT of the second IAB-node transmits the second indication information to the DU of the second IAB-node.

In some embodiments, when the second downlink F1AP message further includes the second buffer indication information, in 1306, the DU of the second IAB-node forwards the third RRC reconfiguration message to the third IAB-node when receiving the second indication information. The above-described second indication information, configuration information of the second indication information, second buffer indication information and the second path migration indication information may be information elements (IEs) newly added in a message, and values thereof may be default values; however, the embodiments of this disclosure are not limited thereto.

In some embodiments, when the random access of the first IAB-node is successful, the method further includes:

1307: the first IAB-node transmits a first RRC reconfiguration complete message to the donor-CU;

1308: the first IAB-node receives a second RRC reconfiguration complete message transmitted by the second IAB-node;

1309: the first IAB-node forwards the second RRC reconfiguration complete message to the donor-CU;

1310: the second IAB-node receives a third RRC reconfiguration complete message transmitted by the third IAB-node; and

1311: the second IAB-node forwards the third RRC reconfiguration complete message to the donor-CU.

In some embodiments, in 1307, after reconfiguration of the first IAB-node is completed, the first IAB-node transmits the first RRC reconfiguration complete message to the second parent node, and the second parent node forwards the first RRC reconfiguration complete message to the donor-CU, wherein the second parent node may transmit an uplink F1AP message to the donor-CU, the uplink F1AP message carrying the first RRC reconfiguration complete message, and reference may be made to existing techniques for details.

In some embodiments, in 1308 and 1309, after reconfiguration of the second IAB-node is completed, the second IAB-node transmits the second RRC reconfiguration complete message to the first IAB-node, and the first IAB-node forwards the second RRC reconfiguration complete message to the donor-CU, wherein the first IAB-node may transmit a first uplink F1AP message to the donor-CU, the first uplink F1AP message carrying the second RRC reconfiguration complete message.

In some embodiments, in 1310 and 1311, after reconfiguration of the third IAB-node is completed, the third IAB-node transmits the third RRC reconfiguration complete message to the second IAB-node, and the second IAB-node forwards the third RRC reconfiguration complete message to the donor-CU, wherein the second IAB-node may transmit a second uplink F1AP message to the donor-CU, the second uplink F1AP message carrying the third RRC reconfiguration complete message.

Figure 14:
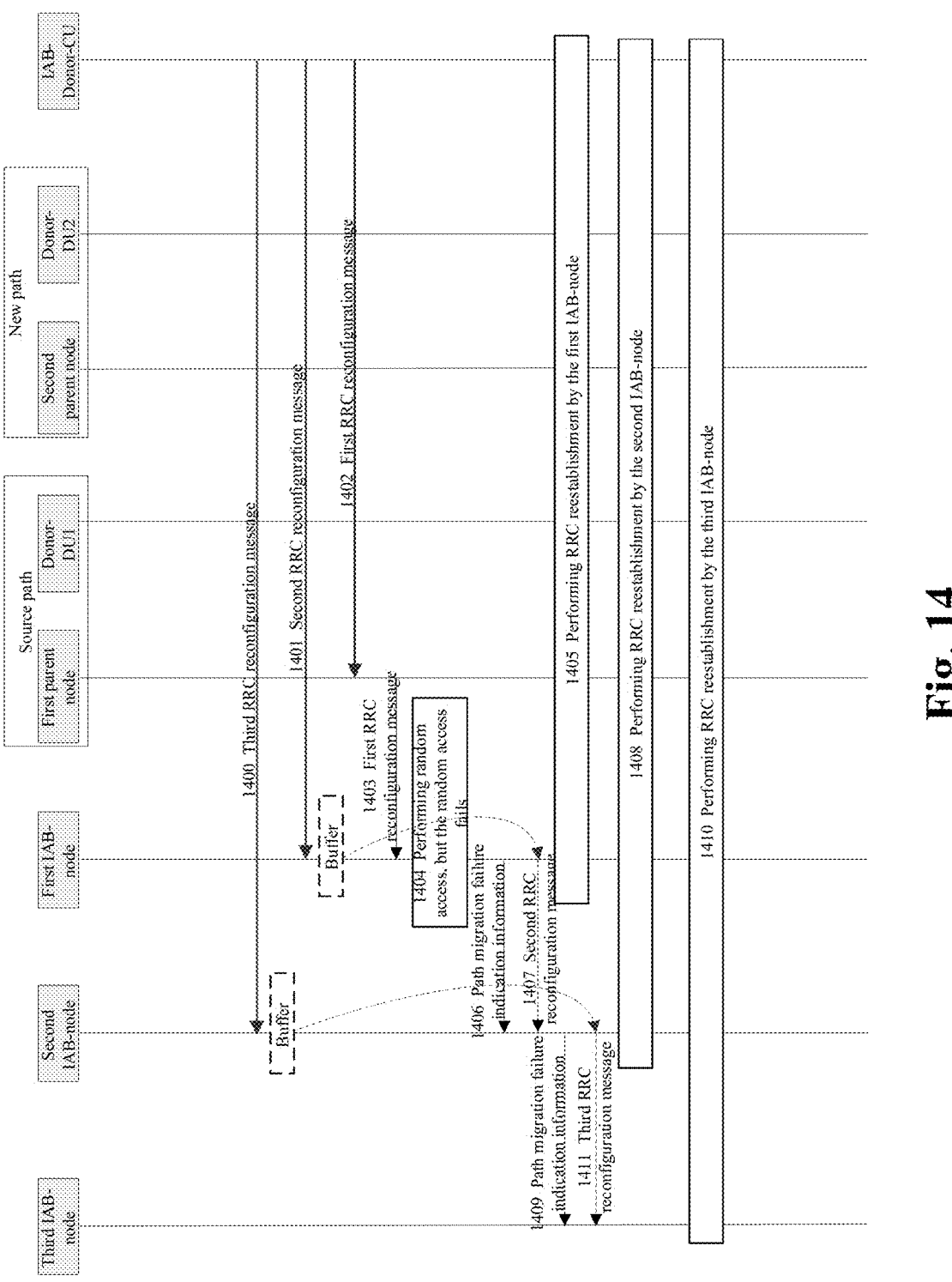

FIG. 14 is a schematic diagram of the message transmission method. As shown in FIG. 14, the method includes:

1400: the donor-CU transmits a third RRC reconfiguration message for path migration of the third IAB-node to the second IAB-node;

1401: the donor-CU transmits a second RRC reconfiguration message for path migration of the second IAB-node b to the first IAB-node;

1402: the donor-CU transmits a first RRC reconfiguration message for path migration of the first IAB-node to the first parent node;

1403: the first parent node forwards the first RRC reconfiguration message to the first IAB-node; and

1404: the first IAB-node performs random access to the second parent node;

wherein implementations of 1400-1404 are identical to those of 1300-1304, which shall not be repeated herein any further.

In some embodiments, the method may further include:

1405: when the random access of the first IAB-node fails, the first IAB-node triggers an RRC reestablishment procedure;

1406: the first IAB-node transmits path migration failure indication information to the second IAB-node;

1407: the first IAB-node forwards the second RRC reconfiguration message to the second IAB-node, or the first IAB-node clears the second RRC reconfiguration message;

1408: the second IAB-node triggers an RRC reestablishment procedure when receiving the path migration failure indication information.

Optionally, the method may further include:

1409: the second IAB-node forwards the path migration failure indication information to the third IAB-node;

1410: the third IAB-node triggers an RRC reestablishment procedure when receiving the path migration failure indication information; and

1411: the second IAB-node forwards the third RRC reconfiguration message to the third IAB-node, or the second IAB-node clears the third RRC reconfiguration message.

In some embodiments, in 1405 and 1408, when T304 expires, it indicates that the random access fails, or is not completed, or is unsuccessful. Reference may be made to existing techniques for a process of RRC reestablishment, and reference may be made to 1002 in the embodiments of the second aspect for implementation of 1406, which shall not be repeated herein any further.

In some embodiments, in 1406, when the first RRC reconfiguration message contains the first parameter configured for the first IAB-node to change a transmission path and/or the first path migration indication information, the first IAB-node transmits the path migration failure indication information to the second IAB-node.

In some embodiments, the first RRC reconfiguration message further includes configuration information of the path migration failure indication information, the configuration information of the path migration failure indication information being used to indicate that the first IAB-node may transmit the path migration failure indication information to the second IAB-node when the random access fails. For example, when the random access of the first IAB-node fails, if the first RRC reconfiguration message contains the configuration information of the path migration failure indication information, the first IAB-node transmits the path migration failure indication information to the second IAB-node, or if the first RRC reconfiguration message contains the first parameter and/or the first path migration indication information and the configuration information of the path migration failure indication information, the first IAB-node transmits the path migration failure indication information to the second IAB-node.

In some embodiments, in 1407, the first IAB-node forwards the second RRC reconfiguration message to the second IAB-node, or clears the second RRC reconfiguration message. This step is optional, and the embodiments of this disclosure is not limited thereto. In addition, implementations of 1409-1411 are similar to those of 1406-1408, which shall not be repeated herein any further.

Figure 15:
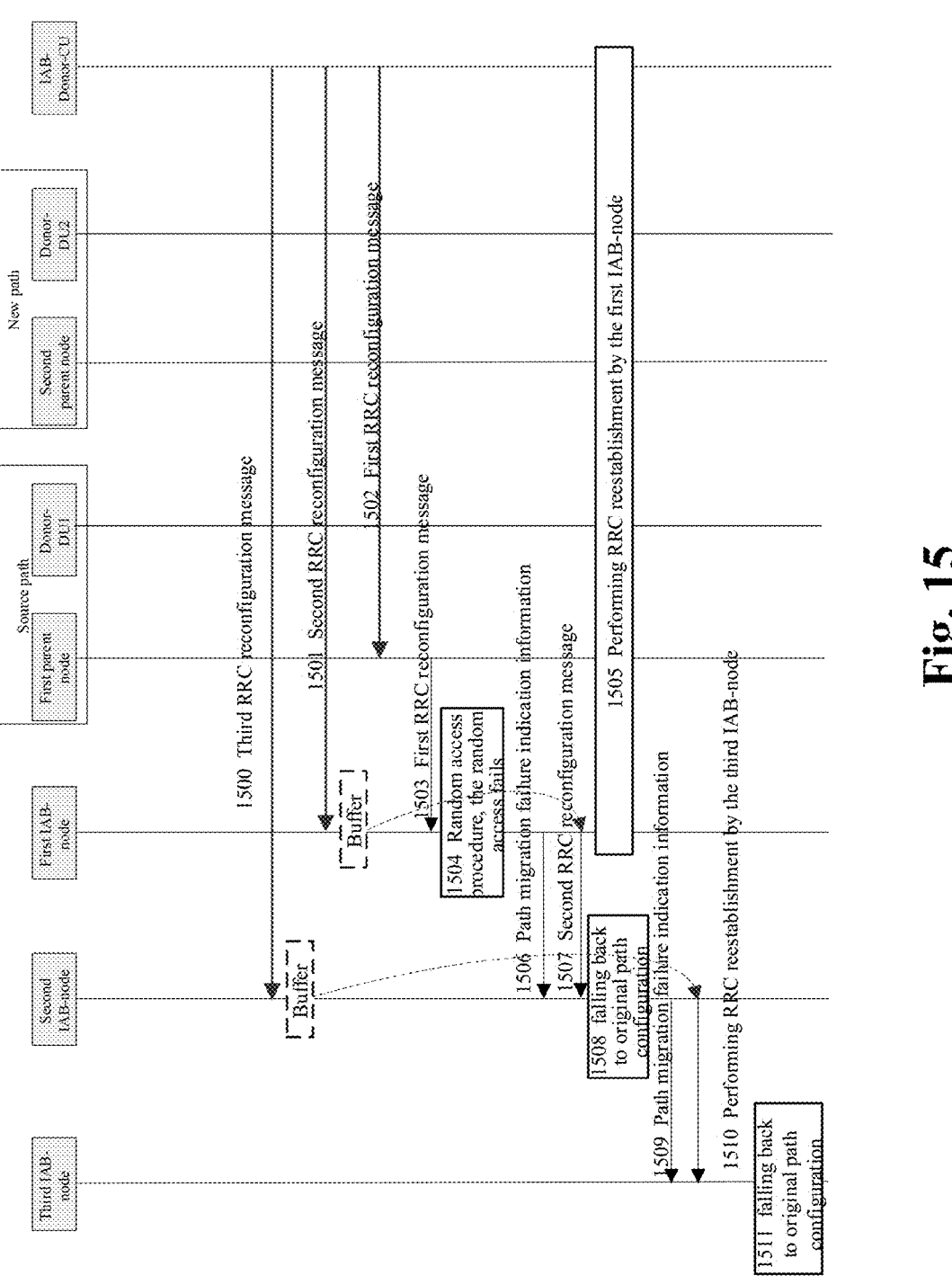

FIG. 15 is a schematic diagram of the message transmission method. As shown in FIG. 15, the method includes:

1500: the donor-CU transmits a third RRC reconfiguration message for path migration of the third IAB-node to the second IAB-node;

1501: the donor-CU transmits a second RRC reconfiguration message for path migration of the second IAB-node to the first IAB-node;

1502: the donor-CU transmits the first RRC reconfiguration message for path migration of the first IAB-node to the first parent node;

1503: the first parent node forwards the first RRC reconfiguration message to the first IAB-node;

1504: the first IAB-node performs random access to the second parent node;

1505: when the random access of the first IAB-node fails, the first IAB-node triggers an RRC reestablishment procedure;

1506: the first IAB-node transmits the path migration failure indication information to the second IAB-node, wherein implementations of 1500-1506 are identical to those of 1400-1406, which shall not be repeated herein any further;

1507: the first IAB-node forwards the second RRC reconfiguration message to the second IAB-node;

1508: when the second IAB-node receives the path migration failure indication information and the second RRC reconfiguration message, the second IAB-node does not perform an RRC reestablishment procedure, but falls back to the original path configuration;

1509: the second IAB-node forwards the path migration failure indication information to the third IAB-node;

1510: the second IAB-node forwards the third RRC reconfiguration message to the third IAB-node; and

1511: when the third IAB-node receives the path migration failure indication information and the third RRC reconfiguration message, the third IAB-node does not perform an RRC reestablishment procedure, but falls back to the original path configuration.

In some embodiments, what is different from those in FIG. 14 is that the first IAB-node does not optionally forward the second RRC reconfiguration message to the second IAB-node, but necessarily forwards, that is, 1507 is a necessary step; otherwise, a packet data aggregation protocol (PDCP) of the second IAB-node may be abnormal. Reference may be made to 1305 for how the first IAB-node forwards the second RRC reconfiguration message, which shall not be repeated herein any further.

Reference may be made to implementation of 1104 in the embodiments of the second aspect for implementation of 1508, and implementations of 1509-1511 are similar to implementations of 1506-1508, which shall not be repeated herein any further.

Implementation scenario 2: a difference from implementation scenario 1 is that the above RRC reconfiguration messages are carried by one downlink message, which may not only reduce service interruption timing but also save signaling overhead.

Figure 16:
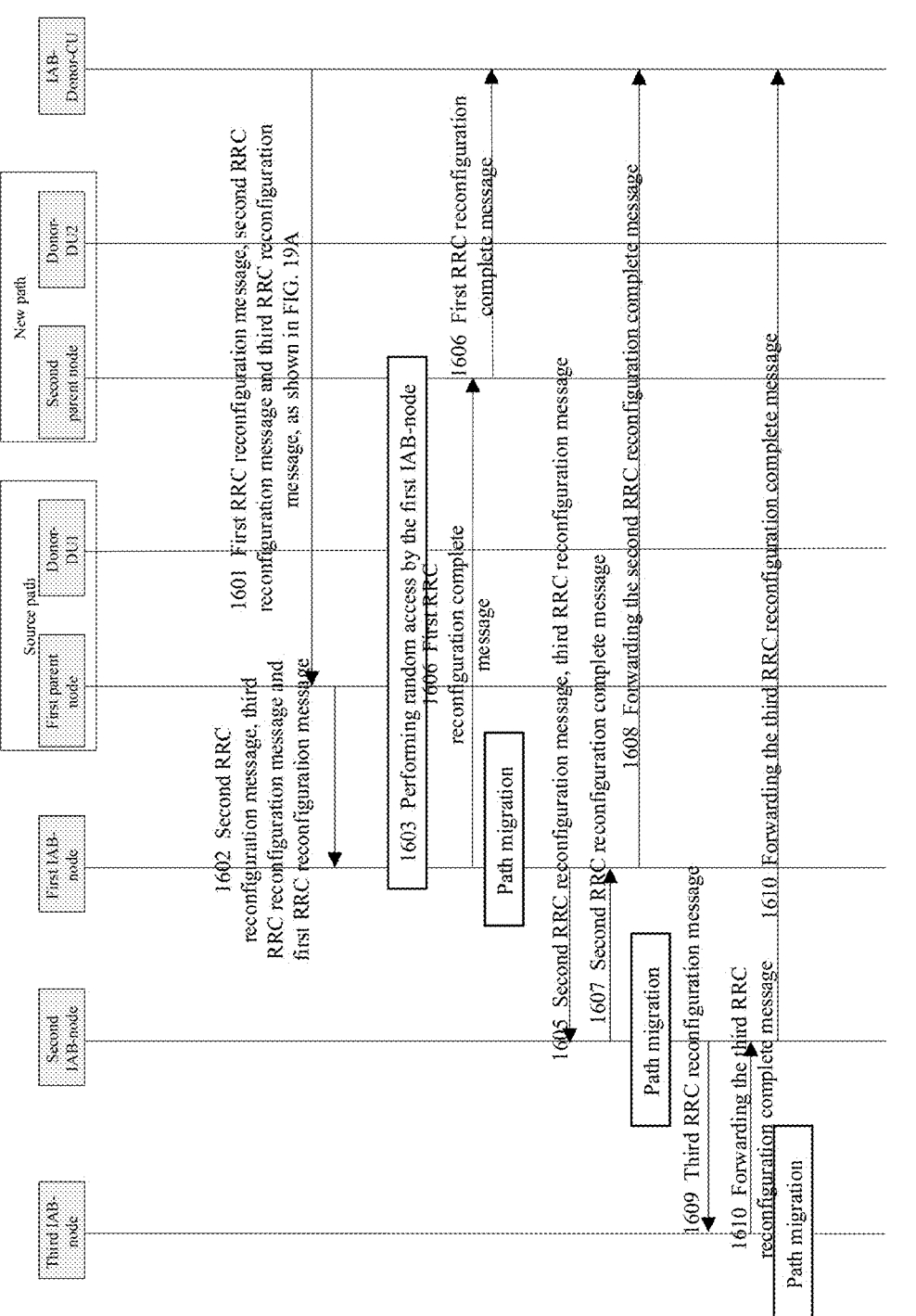
FIGS. 16-17 are schematic diagrams of another scenario of the message transmission method of the embodiment of this disclosure.

FIG. 16 is a schematic diagram of the message transmission method. As shown in FIG. 16, the method includes:

1601: the donor-CU transmits a first RRC reconfiguration message for path migration of the first IAB-node and a second RRC reconfiguration message for path migration of the second IAB-node to the first parent node;

1602: the first parent node forwards the first RRC reconfiguration message and the second RRC reconfiguration message to the first IAB-node;

1603: the first IAB-node performs random access to the second parent node;

1604: when the random access is successful, the first IAB-node forwards the second RRC reconfiguration message to the second IAB-node.

Optionally, when the second IAB-node has a child node, i.e. a third IAB-node, the method may further include:

in 1601, the donor-CU transmits a third RRC reconfiguration message for path migration of the third IAB-node to the first parent node; in 1602, the first parent node further forwards the third RRC reconfiguration message to the first IAB-node, and in 1604, the first IAB-node further forwards the third RRC reconfiguration message to the second IAB-node; and

1605: the second IAB-node forwards the third RRC reconfiguration message to the third IAB-node when receiving the second RRC reconfiguration message and the third RRC reconfiguration message.

In some embodiments, the second RRC reconfiguration message is carried by the first RRC reconfiguration message, and the third RRC reconfiguration message is contained in the second RRC reconfiguration message. Contents of information elements contained in the RRC reconfiguration messages are as described above, which shall not be repeated herein any further.

In 1601, the donor-CU carries all the first RRC reconfiguration message, the second RRC reconfiguration message and the third RRC reconfiguration message in one downlink F1AP message. As an example, the downlink F1AP message may be a UE CONTEXT SETUP REQUEST message. The UE CONTAXT SETUP REQUEST message may further include a first context identifier of the above UE. Reference may be made to existing techniques for details, which shall not be repeated herein any further.

FIG. 19A is a schematic diagram of a structure of the downlink F1AP message. As shown in FIG. 19A, the first RRC reconfiguration message is carried by the downlink F1AP message transmitted by donor-CU to the first parent node, the second RRC reconfiguration message is contained in the first RRC reconfiguration message, and the third RRC reconfiguration message is contained in the second RRC reconfiguration message.

In addition, in order for the first IAB-node to identify the second RRC reconfiguration message transmitted to the second IAB-node, the first RRC reconfiguration message further includes identification information of the second IAB-node, the identification information being a parent node cell identifier of the second IAB-node (such as a DU cell identifier of the first IAB-node) and a cell radio network temporary identifier (C-RNTI) of the second IAB-node in the parent node cell (such as a CNTI of the MT of the second IAB-node in a DU cell of the first IAB-node), or, the identification information being a UE F1AP identifier of the second IAB-node in its parent node (such as a DU UE F1AP ID of the MT of the second IAB-node in the DU of the first IAB-node). Likewise, the second RRC reconfiguration message further contains identification information of the third IAB-node, the identification information being a parent node cell identifier of the third IAB-node (such as a DU cell identifier of the second IAB-node) and a cell radio network temporary identifier (C-RNTI) of the third IAB-node in the parent node cell (such as a CNTI of the MT of the third IAB-node in a DU cell of the second IAB-node), or, the identification information being a UE F1AP identifier of the third IAB-node in its parent node (such as a DU UE F1AP ID of the MT of the third IAB-node in the DU of the second IAB-node).

In some embodiments, after receiving the F1AP message, the first parent node transmits the first RRC reconfiguration message therein to the first IAB-node. In 1604 and 1605, the first IAB-node extracts the second RRC reconfiguration message from the first RRC reconfiguration message and forwards it to the second IAB-node. After receiving the second RRC reconfiguration message, the second IAB-node extracts the third RRC reconfiguration message therefrom and forwards it to the third IAB-node. Specifically, when the mobile terminal (MT) of the first IAB-node is successful in the random access, it transmits the second RRC reconfiguration message to the DU of the first IAB-node, and then forwards it to the second IAB-node. When the first RRC reconfiguration message contains the first parameter configured for the first IAB-node to change a transmission path and/or contains the first path migration indication information, it indicates that the first RRC reconfiguration message is used for path migration of the first IAB-node, and the MT of the first IAB-node transmits the second RRC reconfiguration message to the DU of the first IAB-node. Reference may be made to the embodiments of the first aspect for meaning(s) of the first parameter and/or the first path migration indication information, which shall not be repeated herein any further. When receiving the second RRC reconfiguration message, the mobile terminal (MT) of the second IAB-node transmits the third RRC reconfiguration message to the DU of the second IAB-node, and then forwards it to the third IAB-node. When the second RRC reconfiguration message contains the second parameter configured for the second IAB-node to change a transmission path and/or contains the second path migration indication information, it indicates that the second RRC reconfiguration message is used for path migration of the second IAB-node, and the MT of the second IAB-node transmits the third RRC reconfiguration message to the DU of the second IAB-node. Reference may be made to the embodiments of the second aspect for meaning(s) of the second parameter and/or the second path migration indication information, which shall not be repeated herein any further.

Furthermore, the third RRC reconfiguration message is used for path migration of the third IAB-node. Hence, the third RRC reconfiguration message contains a third parameter configured for the third IAB-node to change a transmission path. After receiving the third RRC configuration message, the third IAB-node may perform path migration. Reference may be made to existing techniques for operations of path migration, and a meaning of the third parameter is similar to that of the first parameter, which shall not be repeated herein any further.

In some embodiments, when the third IAB-node has a child node, the third RRC reconfiguration message may further include a fourth RRC reconfiguration message for path migration of its child node. When receiving the third RRC reconfiguration message, the third IAB-node forwards the fourth RRC reconfiguration message therein to its child node. Implementation of forwarding is identical to that of the second IAB-node, which shall not be repeated herein any further.

Hence, the donor-CU does not need to transmit a downlink F1AP message respectively for the first IAB-node, the second IAB-node and the third IAB-node. This may save signaling overhead, and through layer by layer message forwarding, the first IAB-node, the second IAB-node and the third IAB-node may almost simultaneously receive respective RRC reconfiguration messages. Furthermore, when the random access is successful (random access to the second parent node is successful), the first IAB-node performs message forwarding, thereby making the first IAB-node, the second IAB-node and the third IAB-node to simultaneously perform network topology adaptation, and reducing service interruption timing.

In some embodiments, when the random access of the first IAB-node is successful, the method may further include:

1606: the first IAB-node transmits a first RRC reconfiguration complete message to the donor-CU;

1607: the first IAB-node receives a second RRC reconfiguration complete message transmitted by the second IAB-node;

1608: the first IAB-node forwards the second RRC reconfiguration complete message to the donor-CU;

1609: the second IAB-node receives the third RRC reconfiguration complete message transmitted by the third IAB-node; and

1610: the second IAB-node forwards the third RRC reconfiguration complete message to the donor-CU.

In some embodiments, reference may be made to 1307-1311 in implementation scenario 1 for implementations of 1606-1610, which shall not be repeated herein any further.

Figure 17:
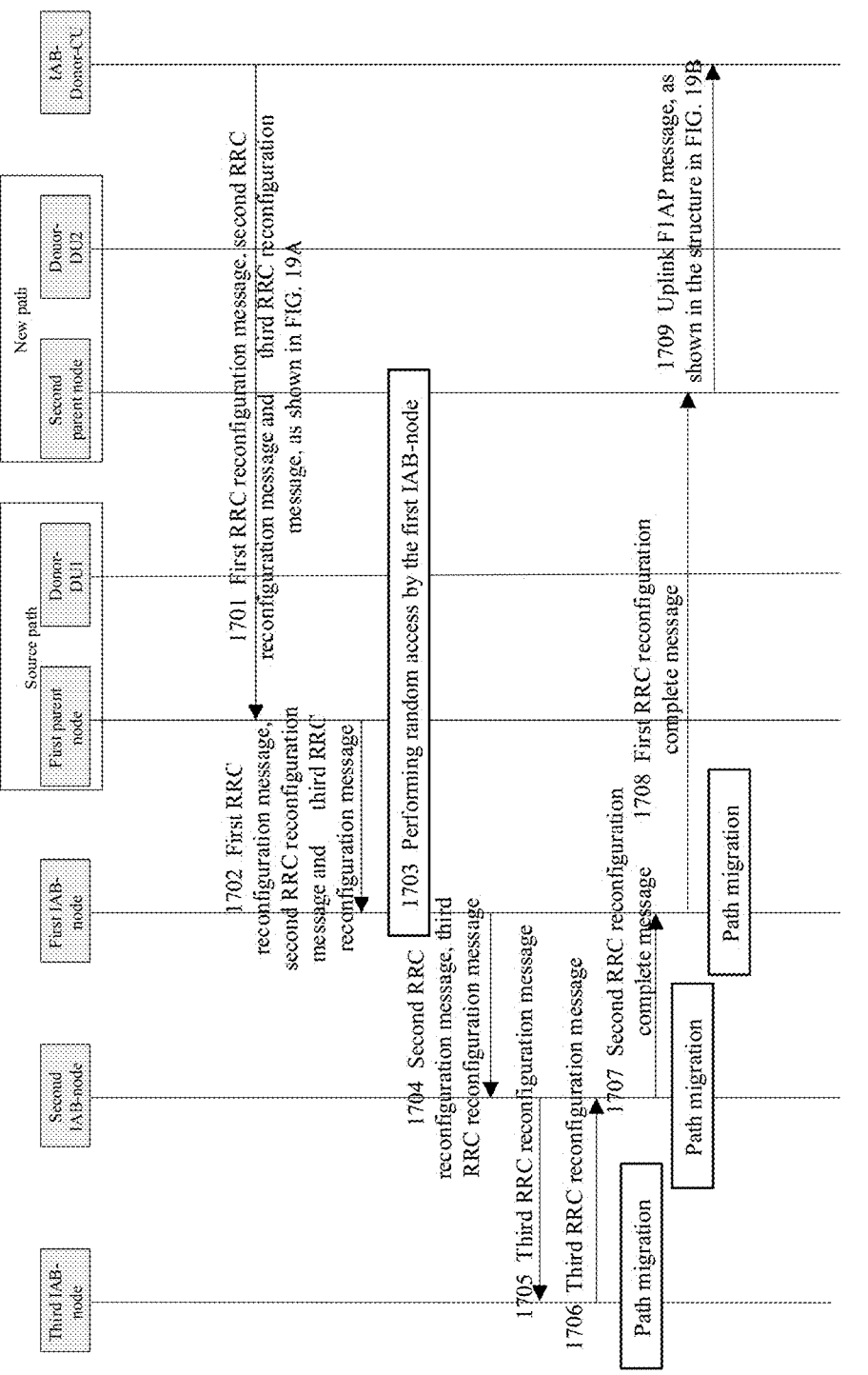

FIG. 17 is another schematic diagram of the message transmission method, which is different from FIG. 16 in that the RRC reconfiguration complete messages of the IAB-nodes are not transmitted via different uplink messages, but are carried by the second parent node via the same uplink F1AP message and transmitted to the donor-CU, thereby further reducing signaling overhead. As shown in FIG. 17, the method includes operations 1701, 1702, 1703, 1704 and 1705 identical to operations 1601-1605 in FIG. 16. Furthermore, the method may include:

1706: the second IAB-node receives the third RRC reconfiguration complete message transmitted by the third IAB-node;

1707: the first IAB-node receives the second RRC reconfiguration complete message transmitted by the second IAB-node;

1708: the first IAB-node transmits the first RRC reconfiguration complete message to the second parent node; and

1709: the second parent node forwards the first RRC reconfiguration complete message to the donor-CU.

In some embodiments, in 1707-1709, the second IAB-node includes the third RRC reconfiguration complete message in the second RRC reconfiguration complete message and transmits it to the first IAB-node, the first IAB-node includes the second RRC reconfiguration complete message in the first RRC reconfiguration complete message and transmits it to the second parent node, and the second parent node transmits an uplink F1AP message to the donor-CU, the uplink F1AP message carrying the first RRC reconfiguration complete message.

FIG. 19B is a schematic diagram of a structure of the uplink F1AP message. As shown in FIG. 19B, the first RRC reconfiguration complete message is carried by the uplink F1AP message transmitted by the second parent node to the donor-CU, the second RRC reconfiguration complete message is included in the first RRC reconfiguration complete message, and the third RRC reconfiguration complete message is included in the second RRC reconfiguration complete message.

In addition, in order for the donor-CU to identify the second RRC reconfiguration complete message from the second IAB-node, the first RRC reconfiguration complete message further includes identification information of the second IAB-node. Likewise, the second RRC reconfiguration complete message further contains identification information of the third IAB-node. The identification information is as described above, and shall not be described herein any further.

In some embodiments, in 1706-1709, the third IAB-node completes RRC reconfiguration, transmits the third RRC reconfiguration complete message to the second IAB-node, and performs F1 transmission path migration; the second IAB-node receives the third RRC reconfiguration complete message, completes RRC reconfiguration of its own, includes the third RRC reconfiguration complete message in the second RRC reconfiguration complete message, transmits it to the first IAB-node, and achieve F1 transmission path migration; the first IAB-node receives the second RRC reconfiguration complete message, completes RRC reconfiguration of its own, includes the second RRC reconfiguration complete message in the first RRC reconfiguration complete message, transmits it to its second parent node, and achieves F1 transmission path migration. The second parent node carries the first RRC reconfiguration complete message via an uplink F1AP message, and transmits it to the donor-CU.

Currently, the uplink RRC messages of the child node of the IAB-node are carried by F1AP and are transmitted via a backhaul RLC channel (i.e. forwarded by a BAP layer), hence, there is no need to wait for the RRC reconfiguration complete message of the child node to be received before transmitting the RRC reconfiguration complete message of its own. Therefore, in order to carry the RRC reconfiguration complete messages of the IAB-nodes via one uplink F1AP message, the first RRC reconfiguration message may further include complete message transmission occasion configuration information, which is used to indicate that the first IAB-node transmits the RRC reconfiguration complete message of its own after receiving the RRC reconfiguration complete message transmitted by the child node.

In some embodiments, the first RRC reconfiguration complete message transmitted by the first IAB-node is a first uplink data transmitted by the first IAB-node by using the new F1 transmission path. However, the first IAB-node may transmit the first RRC reconfiguration complete message only after receiving the second RRC reconfiguration complete message. Therefore, the first IAB-node shall not use the new F1 transmission path to transmit other uplink data in a period from receiving the first RRC reconfiguration message to transmitting the first RRC reconfiguration complete message. In 1702, when the first IAB-node receives the first RRC reconfiguration message, it suspends all uplink transmissions (including scheduling requests and buffer status reports), including transmission of data radio bearers and BH RLC channels. After transmitting the first RRC reconfiguration complete message, it recovers the transmission of data radio bearers and BH RLC channels, or, after receiving the second RRC reconfiguration complete message, it recovers uplink transmission. At this moment, as a priority of an RRC signaling message is higher than that of data, after the uplink transmission is recovered, it may be ensured that the first RRC reconfiguration complete message is preferentially transmitted.

FIGS. 16-17 show the information exchange of the IAB-nodes when the random access of the first IAB-node is successful. When the random access of the first IAB-node fails, the method may further include: 1405-1411 or 1505-1511 in implementation scenario 1, with repeated parts being not going to be described herein any further.

Implementation scenario 3: a difference from implementation scenario 2 is that a message structure of the downlink F1AP message transmitted by the donor-CU to the first parent node is different.

The structure of the downlink message shall be described below. FIG. 20A is a schematic diagram of the structure of the downlink F1AP message. As shown in FIG. 20A, the downlink F1AP message carries the first RRC reconfiguration message, the first RRC reconfiguration message contains a third downlink F1AP message transmitted by the donor-CU to the first IAB-node, the second RRC reconfiguration message is carried by the third downlink F1AP message, the second RRC reconfiguration message contains a fourth downlink F1AP message transmitted by the donor-CU to the second IAB-node, and the third RRC reconfiguration message is carried by the fourth downlink F1AP message. The third downlink F1AP message further includes identification information of the second IAB-node (such as a DU UE F1AP ID of the second IAB-node), and the fourth downlink F1AP message further includes identification information of the third IAB-node (such as a DU UE F1AP ID of the third IAB-node).

Figure 18:
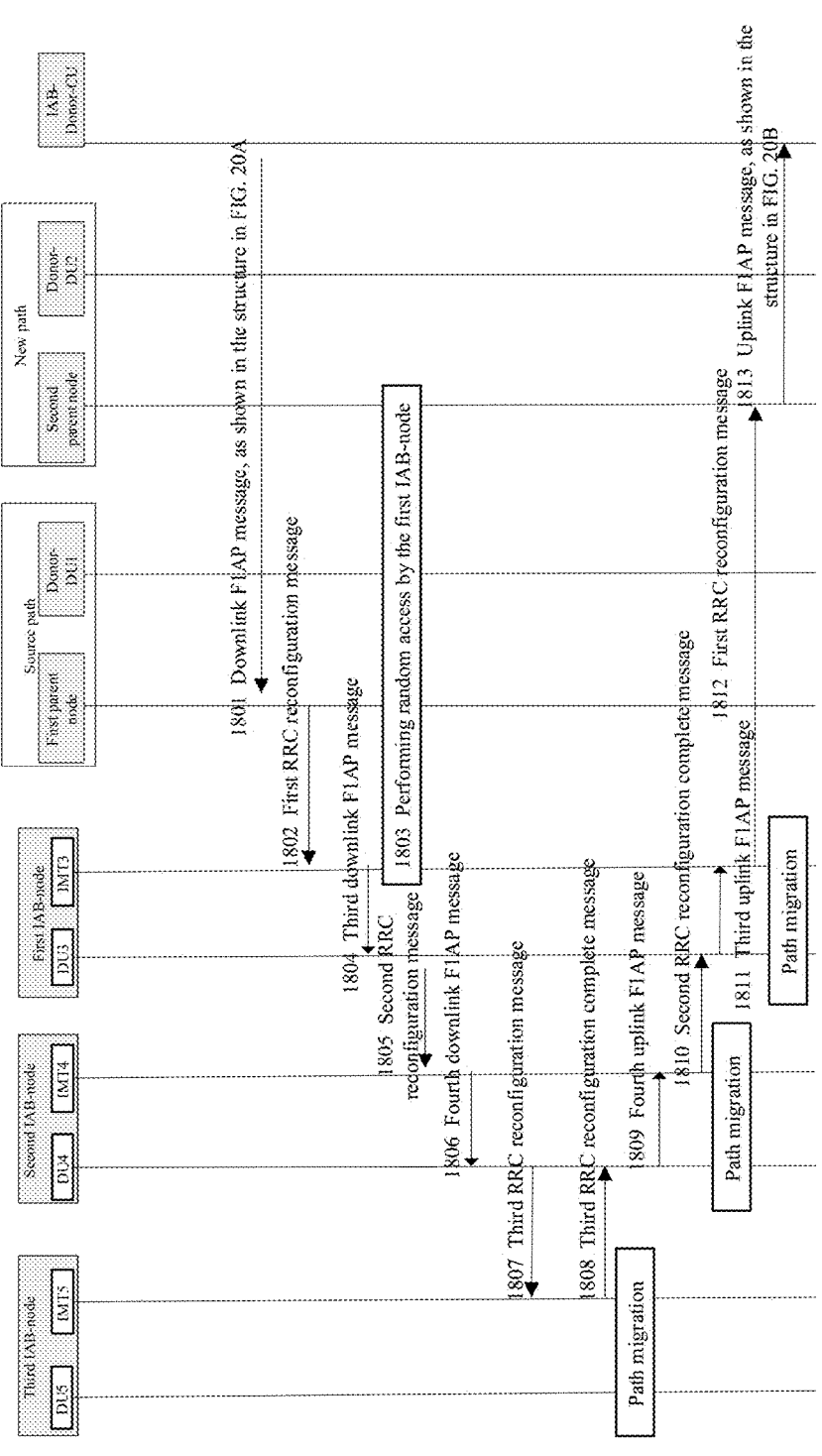
FIG. 18 is a schematic diagram of a further scenario of the message transmission method of the embodiment of this disclosure.

FIG. 18 is a schematic diagram of the message transmission method. As shown in FIG. 18, the method includes:

1801: the donor-CU transmits the downlink F1AP message with the structure shown in FIG. 20A to the first parent node;

1802: the first parent node extracts the first RRC reconfiguration message and forwards it to the MT of the first IAB-node;

1803: the first IAB-node performs random access to the second parent node;

1804: when the random access is successful, the MT of the first IAB-node extracts the third downlink F1AP message from the first RRC reconfiguration message and transmits the third downlink F1AP message to the DU of the first IAB-node;

1805: the DU of the first IAB-node forwards the second RRC reconfiguration message in the third downlink F1AP message to the MT of the second IAB-node;

1806: the MT of the second IAB-node extracts the fourth downlink F1AP message from the second RRC reconfiguration message and transmits the fourth downlink F1AP message to the DU of the second IAB-node; and

1807: the DU of the second IAB-node forwards the third RRC reconfiguration message in the fourth downlink F1AP message to the MT of the third IAB-node.

In some embodiments, in 1804, when the first RRC reconfiguration message contains a first parameter configured for the first IAB-node to change a transmission path and/or contains first path migration indication information, it indicates that the first RRC reconfiguration message is used for path migration of the first IAB-node. The MT of the first IAB-node extracts the third downlink F1AP message from the first RRC reconfiguration message and transmits the third downlink F1AP message to the DU of the first IAB-node, and reference may be made to the embodiments of the first aspect for meaning(s) of the first parameter and/or the first path migration indication information, which shall not be repeated herein any further. In 1806, when the second RRC reconfiguration message contains a second parameter configured for the second IAB-node to change a transmission path and/or contains second path migration indication information, it indicates that the second RRC reconfiguration message is used for path migration of the second IAB-node, and the MT of the second IAB-node extracts the fourth downlink F1AP message from the second RRC reconfiguration message and transmits the fourth downlink F1AP message to the DU of the second IAB-node. Reference may be made to the embodiments of the second aspect for meaning(s) of the second parameter and/or the second path migration indication information, which shall not be repeated herein any further.

In addition, the third RRC reconfiguration message is used for path migration of the third IAB-node. Therefore, the third RRC reconfiguration message contains a third parameter configured for the third IAB-node to changes a transmission path. After receiving the third RRC configuration message, the third IAB-node may perform path migration. Reference may be made to existing techniques for operations of the path migration may, and a meaning of the third parameter is similar to that of the first parameter, which shall not be repeated herein any further.

In some embodiments, when the third IAB-node has child node(s), the third RRC reconfiguration message may further include a fifth downlink F1AP message, the fifth downlink F1AP message including a fourth RRC reconfiguration message for path migration of its child node. When receiving the third RRC reconfiguration message, the third IAB-node forwards the fourth RRC reconfiguration message therein to its child node, and implementation of the forwarding is identical to that of the second IAB-node, which shall not be described herein any further. When the third IAB-node has no child node, the third IAB-node performs path migration after receiving the third RRC reconfiguration message, and does not need to perform forwarding actions. Reference may be made to existing technologies for details, which shall not be repeated herein any further.

Hence, the donor-CU does not need to transmit a downlink F1AP message respectively for the first IAB-node, the second IAB-node and the third IAB-node. This may save signaling overhead, and through layer by layer message forwarding, the first IAB-node, the second IAB-node and the third IAB-node may almost simultaneously receive respective RRC reconfiguration messages. Furthermore, when the random access is successful (random access to the second parent node is successful), the first IAB-node performs message forwarding, thereby making the first IAB-node, the second IAB-node and the third IAB-node to simultaneously perform network topology adaptation, and reducing service interruption timing.

In some embodiments, the downlink F1AP message in FIG. 20A may be a UE CONTENT SETUP REQUEST message. The UE CONTAXT SETUP REQUEST message may include topology-related reconfiguration information reconfigured for the BH RLC channel of the first IAB-node, the reconfiguration information including backhaul RLC channel mapping relationship reconfiguration information, and/or backhaul RLC channel modification information between the first IAB-node and its child node.

For example, the backhaul RLC channel mapping relationship reconfiguration information refers to a mapping relationship between a BH RLC channel between the first IAB-node and the second IAB-node and a BH RLC channel between the first IAB-node and the second parent node, and the backhaul RLC channel modification information refers to information related to addition, modification and deletion of the BH RLC channel between the first IAB-node and the second IAB-node, for example, the modification information includes modifying a quality of service (QoS) parameter of the BH RLC channel.

Another difference between this embodiment and implementation scenario 2 is that the message structure of the uplink F1AP message transmitted by the second parent node to donor-CU is different.

The structure of the uplink message shall be described below. The first RRC reconfiguration complete message, the second RRC reconfiguration complete message and the third RRC reconfiguration complete message are all carried by one uplink F1AP message. FIG. 20B is a schematic diagram of the structure of the uplink F1AP message. As shown in FIG. 20B, the third RRC reconfiguration complete message is carried by a fourth uplink F1AP message of the second IAB-node, the fourth uplink F1AP message being carried by the second RRC reconfiguration complete message, the second RRC reconfiguration complete message is carried by a third uplink F1AP message of the first IAB-node, the third uplink F1AP message being carried by the first RRC reconfiguration complete message, and the first RRC reconfiguration complete message is contained in an uplink F1AP message transmitted by the second parent node to the donor-CU (such as UL RRC MESSAGE TRNASFOR). The third uplink F1AP message includes the identification information of the second IAB-node, and the fourth uplink F1AP message includes the identification information of the third IAB-node. Implementation of the identification information is consistent with the identification information in the downlink F1AP message, and shall not be repeated herein any further.

In some embodiments, when the random access is successful, the method may further include:

1808: the DU of the second IAB-node receives the third RRC reconfiguration complete message transmitted by the MT of the third IAB-node;

1809: the DU of the second IAB-node contains the third RRC reconfiguration complete message in the fourth uplink F1AP message and transmits it to the MT of the second IAB-node;

1810: the MT of the IAB-node contains the fourth uplink F1AP message in the second RRC reconfiguration complete message and transmits it to the DU of the first IAB-node;

1811: the DU of the first IAB-node contains the second RRC reconfiguration complete message in the third uplink F1AP message and transmits it to the MT of the first IAB-node;

1812: the MT of the first IAB-node contains the third uplink F1AP message in the first RRC reconfiguration complete message and transmits it to the second parent node; and 1813: the second parent node transmits an uplink F1AP message (such as UL RRC MESSAGE TRNASFOR) to the donor-CU, the uplink F1AP message containing the first RRC reconfiguration complete message.

In some embodiments, in 1808-1813, the third IAB-node completes RRC reconfiguration, transmits the third RRC reconfiguration complete message to the second IAB-node, and performs F1 transmission path migration; the second IAB-node receives the third RRC reconfiguration complete message, completes RRC reconfiguration of its own, contains the third RRC reconfiguration complete message in the fourth uplink F1AP message, and contains the fourth F1AP message in the second RRC reconfiguration complete message, and transmits it to the first IAB-node to achieve F1 transmission path migration; and the first IAB-node receives the second RRC reconfiguration complete message, completes RRC reconfiguration of its own, contains the second RRC reconfiguration complete message in the third uplink F1AP message, and contains the third F1AP message in the first RRC reconfiguration complete message, and transmits the third F1AP message to its second parent node to achieve F1 transmission path migration. The second parent node carries the first RRC reconfiguration complete message via one uplink F1AP message and transmits it to the donor-CU.

Currently, the uplink RRC messages of the child node of the IAB-node are carried by an F1AP and transmitted via a backhaul RLC channel (i.e. forwarded by a BAP layer), hence, there is no need to wait for the RRC reconfiguration complete message of the child node to be received before transmitting the RRC reconfiguration complete message of its own. Therefore, in order to carry RRC reconfiguration complete messages of the IAB-nodes via one uplink F1AP message, the first RRC reconfiguration message may further include complete message transmission occasion configuration message, which is used to indicate that the first IAB-node transmits the RRC reconfiguration complete message of its own after receiving the RRC reconfiguration complete message transmitted by the child node.

In some embodiments, the first RRC reconfiguration complete message transmitted by the first IAB-node is a first uplink data transmitted by the first IAB-node by using the new F1 transmission path. However, the first IAB-node may transmit the first RRC reconfiguration complete message only after receiving the second RRC reconfiguration complete message. Hence, the first IAB-node shall not use the new F1 transmission path to transmit other uplink data in a period from receiving the first RRC reconfiguration message to transmitting the first RRC reconfiguration complete message. In 1802, when the first IAB-node receives the first RRC reconfiguration message, it suspends all uplink transmissions (including scheduling requests and buffer status reports), including transmission of data radio bearers and BH RLC channel. After transmitting the first RRC reconfiguration complete message, it recovers the transmission of data radio bearers and BH RLC channel, or after receiving the second RRC reconfiguration complete message, and at this moment, it recovers uplink transmission, and at this moment, as a priority of an RRC signaling message is higher than that of the data, after the uplink transmission is recovered, it may be ensured that the first RRC reconfiguration complete message is transmitted preferentially.

FIG. 18 shows the information exchange between the IAB-nodes when the random access of the first IAB-node is successful. And when the random access of the first IAB-node fails, the method may further include: 1405-1411 or 1505-1511 in implementation scenario 1, which shall not be repeated herein any further.

It should be noted that FIGS. 8-18 only schematically illustrates the embodiments of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIGS. 8-18.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

Embodiments of a Fourth Aspect

The embodiments of this disclosure provide a message transmission apparatus.

Figure 21:
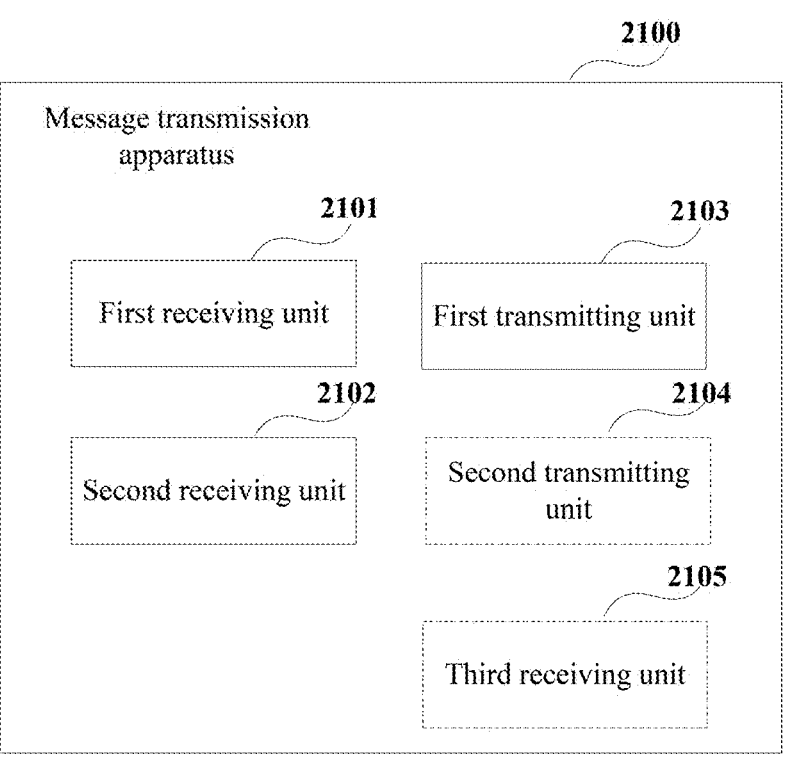
FIG. 21 is a schematic diagram of the message transmission apparatus of an embodiment of this disclosure.

FIG. 21 is a schematic diagram of the message transmission apparatus of the embodiment of this disclosure. The apparatus may be, for example, an IAB-node in an IAB system, or one or some components or assemblies configured in the IAB-node. The IAB system includes a donor device and an IAB-node, and the embodiments of this disclosure shall be explained from a first IAB-node side. An implementation principle of the message transmission apparatus in the embodiments of this disclosure is similar to that in the embodiments of the first aspect, with identical parts being not going to be repeated herein any further.

As shown in FIG. 21, a message transmission apparatus 2100 of this disclosure embodiment includes:

a first receiving unit 2101 configured to receive a second radio resource control (RRC) reconfiguration message for path migration of a second IAB-node from a donor central unit (donor-CU), wherein the second IAB-node is a downstream child node of the first IAB-node;

a second receiving unit 2102 configured to receive a first RRC reconfiguration message for path migration of the first IAB-node from the donor-CU; and a first transmitting unit 2103 configured to forward the second RRC reconfiguration message to the second IAB-node when random access of the first IAB-node is successful.

In some embodiments, reference of the first receiving unit 2101, the second receiving unit 2102, the first transmitting unit 2103 may be made to implementations of 801-803 in the embodiments of the first aspect and the first IAB-node in implementation scenarios 1-3, which shall not be repeated herein any further.

In some embodiments, the second RRC reconfiguration message is carried by a first downlink F1AP message transmitted by the donor-CU.

In some embodiments, the first transmitting unit 2103 includes a first transmitting module and a second transmitting module (not shown in figures), wherein when random access of a mobile terminal (MT) of the first IAB-node is successful, the first transmitting module transmits first indication information to a distribution unit (DU) of the first IAB-node, and the second transmitting module forwards the second RRC reconfiguration message to the second IAB-node when the distribution unit (DU) of the first IAB-node receives the first indication information.

In some embodiments, when the first RRC reconfiguration message contains a first parameter configured for the first IAB-node to change a transmission path, the first transmitting module on the MT of the first IAB-node transmits the first indication information to the DU of the first IAB-node.

In some embodiments, the first parameter configured for the first IAB-node to change a transmission path includes a default backhaul RLC channel, or a default BAP route, or an IP address, configured for the first IAB-node.

In some embodiments, when the first RRC reconfiguration message contains first path migration indication information, the first transmitting module on the MT of the first IAB-node transmits the first indication information to the DU of the first IAB-node, the first path migration indication information indicating that the first RRC reconfiguration message is a reconfiguration message for the first IAB-node to perform path migration.

In some embodiments, the first RRC reconfiguration message further includes configuration information of the first indication information, the configuration information of the first indication information being used to instruct the first transmitting module to transmit the first indication information to the distribution unit (DU) of the first IAB-node when the random access of the MT of the first IAB-node is successful.

In some embodiments, the first downlink F1AP message further includes first buffer indication information, the first buffer indication information being used to instruct the first IAB-node to buffer the second RRC reconfiguration message and release it until the first indication information is received.

In some embodiments, the second RRC reconfiguration message is carried by the first RRC reconfiguration message.

In some embodiments, the first RRC reconfiguration message further includes identification information of the second IAB-node.

In some embodiments, the second RRC reconfiguration message is carried by a third downlink F1AP message from the donor-CU, the third downlink F1AP message being carried by the first RRC reconfiguration message.

In some embodiments, the third downlink F1AP message further includes the identification information of the second IAB-node.

In some embodiments, the first transmitting unit 2103 includes a third transmitting module and a fourth transmitting module (not shown in figures), wherein when the random access of the MT of the first IAB-node is successful, the third transmitting module transmits third downlink F1AP message to the DU of the first IAB-node, and the fourth transmitting module forwards the second RRC reconfiguration message to the second IAB-node when the DU of the first IAB-node receives the third downlink F1AP message.

In some embodiments, the first transmitting unit 2103 further transmits path migration failure indication information to the second IAB-node when the random access of the first IAB-node fails.

In some embodiments, the apparatus further includes a first processing unit (not shown in figures) configured to forward the second RRC reconfiguration message to the second IAB-node, or clear the second RRC reconfiguration message.

In some embodiments, when the first RRC reconfiguration message contains a first parameter configured for the first IAB-node to change a transmission path or first path migration indication information, the first transmitting unit 2103 transmits the path migration failure indication information to the second IAB-node.

In some embodiments, the first RRC reconfiguration message further includes configuration information of the path migration failure indication information, the configuration information of the path migration failure indication information being used to indicate that the first IAB-node transmits the path migration failure indication information to the second IAB-node when the random access fails.

In some embodiments, when the random access of the first IAB-node is successful, the apparatus further includes a second transmitting unit 2104 and a third receiving unit 2105 (optional). The second transmitting unit 2104 transmits a first RRC reconfiguration complete message to the donor-CU, and the third receiving unit 2105 receives a second RRC reconfiguration complete message transmitted by the second IAB-node.

In some embodiments, the second transmitting unit 2104 forwards the second RRC reconfiguration complete message to the donor-CU, the second RRC reconfiguration complete message being carried by the first uplink F1AP message.

In some embodiments, the second transmitting unit 2104 contains the second RRC reconfiguration complete message in the first RRC reconfiguration complete message and forwards it to the donor-CU.

In some embodiments, the second transmitting unit 2104 includes a first receiving module, a fifth transmitting module and a sixth transmitting module that are not shown in figures. The first receiving module on the DU of the first IAB-node receives the second RRC reconfiguration complete message transmitted by the second IAB-node, the fifth transmitting module on the DU of the first IAB-node transmits a third uplink F1AP message containing the second RRC reconfiguration complete message to the MT of the first IAB-node, and the sixth transmitting module on the MT of the first IAB-node contains the third uplink F1AP message in the first RRC reconfiguration complete message and forwards it to the donor-CU.

It should be noted that the components or modules related to this disclosure are only described above. However, this disclosure is not limited thereto, and the message transmission apparatus 2100 of the embodiments of this disclosure may further include other components or modules, and reference may be made to related techniques for particulars of these components or modules.

Furthermore, for the sake of simplicity, connection relationships between the components or modules or signal profiles thereof are only illustrated in FIG. 21. However, it should be understood by those skilled in the art that such related techniques as bus connection, etc., may be adopted. And the above components or modules may be implemented by hardware, such as a processor, a memory, a transmitter, and a receiver, etc., which are not limited in the embodiments of this disclosure.

Therefore, before the IAB-node is handed over to the new parent node, the information related to the network topology adaptation configured for its child node is transmitted by the donor-CU to the IAB-node and buffered in the IAB-node. When the random access to the new parent node where the IAB-node is handed over is successful, the IAB-node forwards the information related to the network topology adaptation configured by the donor-CU for its child node to its child node. Hence, the IAB-node and its child node may be made to perform network topology adaptation almost simultaneously, thereby reducing service interruption timing resulted from node migration.

Embodiments of a Fifth Aspect

The embodiments of this disclosure provide a message transmission apparatus.

Figure 22:
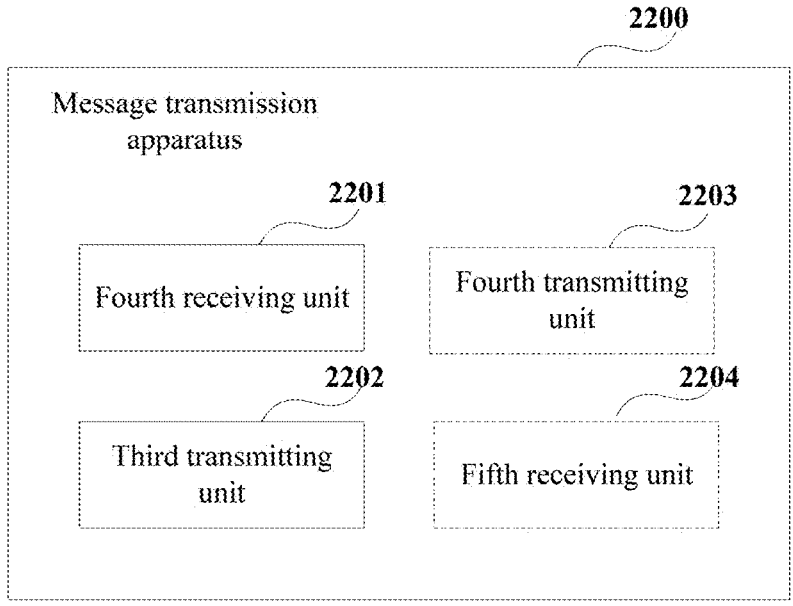
FIG. 22 is another schematic diagram of the message transmission apparatus of the embodiment of this disclosure.

FIG. 22 is a schematic diagram of the message transmission apparatus of the embodiment of this disclosure. The apparatus may be, for example, an IAB-node in an IAB system, or one or some components or assemblies configured in the IAB-node. The IAB system includes a donor device and an IAB-node, and the embodiments of this disclosure shall be explained from a second IAB-node side. An implementation principle of the message transmission apparatus in the embodiments of this disclosure is similar to that in the embodiments of the second aspect, with identical parts being not going to be repeated herein any further.

As shown in FIG. 22, a message transmission apparatus 2200 of this disclosure embodiment includes:

a fourth receiving unit 2201 configured to receive a third RRC reconfiguration message for path migration of a third IAB-node from a donor-CU; and a third transmitting unit 2202 configured to forward the third RRC reconfiguration message to the third IAB-node when receiving a second RRC reconfiguration message transmitted by the donor-CU and forwarded by the first IAB-node, the second RRC reconfiguration message being used for path migration of the second IAB-node, wherein the third IAB-node is a downstream child node of the second IAB-node, and the second IAB-node is a downstream child node of the first IAB-node.

In some embodiments, the third RRC reconfiguration message is carried by a second downlink F1AP message transmitted by the donor-CU.

In some embodiments, the third transmitting unit 2202 includes a seventh transmitting module and an eight transmitting module that are not shown in figures, wherein the seventh transmitting module transmits second indication information to a DU of the second IAB-node when the MT of the second IAB-node receives the second RRC reconfiguration message, and the eight transmitting module forwards the third RRC reconfiguration message to the third IAB-node when the DU of the second IAB-node receives the second indication information.

In some embodiments, when the second RRC reconfiguration message contains a second parameter configured for the second IAB-node to change a transmission path, the seventh transmitting module on the MT of the second IAB-node transmits second indication information to the DU of the second IAB-node.

In some embodiments, the second parameter configured for the second IAB-node to change a transmission path includes a default backhaul RLC channel, or a default BAP route, or an IP address, configured for the second IAB-node.

In some embodiments, when the second RRC reconfiguration message contains second path migration indication information, the seventh transmitting module on the MT of the second IAB-node transmits the second indication information to the DU of the second IAB-node, the second path migration indication information being used to indicate that the second RRC reconfiguration message is a reconfiguration message for the second IAB-node to perform path migration.

In some embodiments, the apparatus is applied when the donor-DU is changed after the first IAB-node is handed over to the new parent node, the second RRC reconfiguration message is used for path migration of the second IAB-node between donor-DUs. The second path migration indication information is used to indicate that the second IAB-node is performing path migration between donor-DUs, that is, when the second RRC message contains the second path migration indication information, it indicates that the second RRC reconfiguration message is a reconfiguration message for the second IAB-node to perform path migration between different donor-DUs.

In some embodiments, the second RRC reconfiguration message further includes configuration information of the second indication information, the configuration information of the second indication information being used to indicate that the MT of the second IAB-node transmits the second indication information to the distribution unit (DU) of the second IAB-node when receiving the second RRC reconfiguration message.

In some embodiments, the second downlink F1AP message further includes second buffer indication information, the second buffer indication information being used to instruct the second IAB-node to buffer the third RRC reconfiguration message and release it until the second indication information is received.

In some embodiments, the third RRC reconfiguration message is included in the second RRC reconfiguration message transmitted by the donor-CU and forwarded by the first IAB-node.

In some embodiments, the second RRC reconfiguration message further includes identification information of the third IAB-node.

In some embodiments, the third RRC reconfiguration message is carried by a fourth downlink F1AP message transmitted by the donor-CU, the fourth downlink F1AP message being carried by the third RRC reconfiguration message.

In some embodiments, the fourth downlink F1AP message further includes identification information of the third IAB-node.

In some embodiments, the third transmitting unit 2202 includes a ninth transmitting module and a tenth transmitting module that are not shown in figures. When the MT of the second IAB-node receives the second RRC reconfiguration message transmitted by the donor-CU and forwarded by the first IAB-node, the ninth transmitting module transmits the fourth downlink F1AP message to the DU of the second IAB-node, and when the DU of the second IAB-node receives the fourth downlink F1AP message, the tenth transmitting module forwards the third RRC reconfiguration message in the fourth downlink F1AP message to the third IAB-node.

In some embodiments, when the second IAB-node receives the second RRC reconfiguration message, the apparatus further includes: a fourth transmitting unit 2203 and a fifth receiving unit 2204 (optional), wherein the fourth transmitting unit 2203 transmits a second RRC reconfiguration complete message to the first IAB-node, and the fifth receiving unit 2204 receives the third RRC reconfiguration complete message transmitted by the third IAB-node.

In some embodiments, the fourth transmitting unit 2203 is further configured to forward the third RRC reconfiguration complete message to the donor-CU, the third RRC reconfiguration complete message being carried by the second uplink F1AP message.

In some embodiments, the fourth transmitting unit 2203 is further configured to include the third RRC reconfiguration complete message in the second RRC reconfiguration complete message and forward it to the donor-CU.

In some embodiments, the fourth transmitting unit 2203 further includes a second receiving module, an eleventh transmitting module and a twelfth transmitting module that are not shown in figures, wherein the second receiving module on the DU of the second IAB-node receives the third RRC reconfiguration complete message transmitted by the third IAB-node, the eleventh transmitting module on the DU of the second IAB-node transmits the fourth uplink F1AP message containing the third RRC reconfiguration complete message to the MT of the second IAB-node, and the twelfth transmitting module on the MT of the IAB-node contains the fourth uplink F1AP message in the second RRC reconfiguration complete message and forwards it to the donor-CU.

Therefore, before the IAB-node is handed over to the new parent node, the information related to the network topology adaptation configured for its child node is transmitted by the donor-CU to the IAB-node and buffered in the IAB-node. When the random access to the new parent node where the IAB-node is handed over is successful, the IAB-node forwards the information related to the network topology adaptation configured by the donor-CU for its child node to its child node. When the child node receives the information, the IAB-node forwards the information related to the network topology adaptation configured by the donor-CU for its child node to its child node. Hence, the IAB-node and its child node may be made to perform network topology adaptation almost simultaneously, thereby reducing service interruption timing resulted from node migration.

Figure 23:
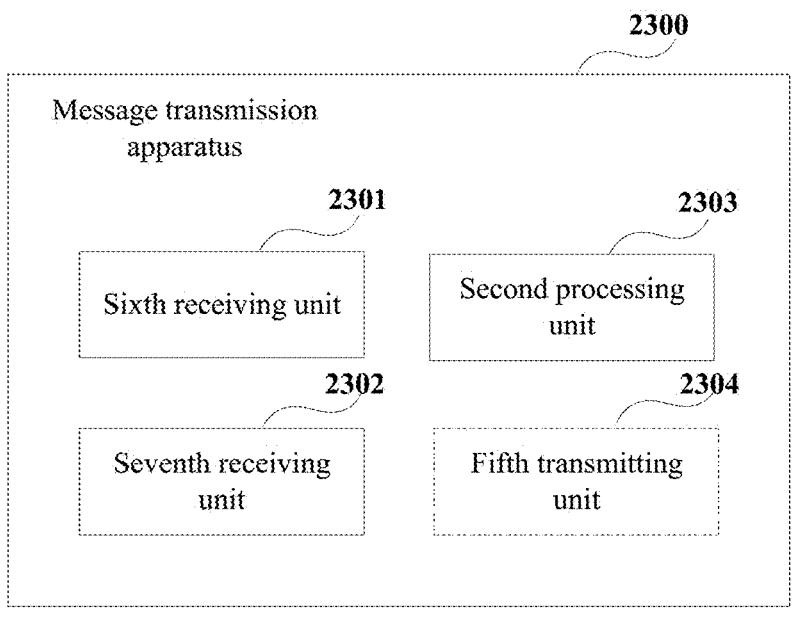
FIG. 23 is a further schematic diagram of the message transmission apparatus of the embodiment of this disclosure.

FIG. 23 is a schematic diagram of the message transmission apparatus of the embodiment of this disclosure. The apparatus may be, for example, an IAB-node in an IAB system, or one or some components or assemblies configured in the IAB-node. The IAB system includes a donor device and an IAB-node, and the embodiments of this disclosure shall be explained from a second IAB-node side. An implementation principle of the message transmission apparatus in the embodiments of this disclosure is similar to that in the embodiments of the second aspect, with identical parts being not going to be repeated herein any further.

As shown in FIG. 23, a message transmission apparatus 2300 of this disclosure embodiment includes:

a sixth receiving unit 2301 configured to receive a third RRC reconfiguration message for path migration of a third IAB-node from a donor-CU;

a seventh receiving unit 2302 configured to receive path migration failure indication information transmitted by a first IAB-node when random access fails; and a second processing unit 2303 configured to trigger an RRC reestablishment procedure or fall back to original path configuration, wherein the third IAB-node is a downstream child node of the second IAB-node, and the second IAB-node is a downstream child node of the first IAB-node.

In some embodiments, the apparatus further includes a fifth transmitting unit 2304 configured to forward a path migration failure indication information to the third IAB-node.

In some embodiments, the second processing unit 2303 is further configured to forward the third RRC reconfiguration message to the third IAB-node, or clear the third RRC reconfiguration message.

In some embodiments, the third RRC reconfiguration message is carried by a second downlink F1AP message transmitted by the donor-CU. The second processing unit 2303 further includes a thirteenth transmitting module and a fourteenth transmitting module, wherein the thirteenth transmitting module on the MT of the second IAB-node transmits second indication information to the DU of the second IAB-node, and when the DU of the second IAB-node receives the second indication information, the fourteenth transmitting module forwards the third RRC reconfiguration message carried by the second downlink F1AP message to the third IAB-node.

In some embodiments, the sixth receiving unit 2301 is further configured to receive the second RRC reconfiguration message for path migration of the second IAB-node transmitted by the donor-CU to the first IAB-node and forwarded by the first IAB-node.

Therefore, when the random access to the new parent node where the IAB-node is handed over fails, it triggers RRC reestablishment and indicates path migration failure to its child node, and at the same time, its child node also triggers RRC reestablishment. Hence, when the IAB-node fails in migration, the IAB-node and its child node may almost simultaneously perform RRC reestablishment, thereby reducing service interruption timing resulted from the path migration failure.

Or, when the random access to the new parent node where the IAB-node is handed over fails, it triggers RRC reestablishment, forwards the RRC reconfiguration of its child node to the child node and indicates path migration failure to its child node, thereby making its child node fall back to original path configuration. Hence, when the IAB-node fails in migration, the IAB-node and its child node may simultaneously fall back to the original path configuration. Otherwise, if the child node performs path migration and generates uplink data according to the new path configuration, these uplink data is dropped subsequently and is retransmitted by the UE, thereby resulting in an increase in latency of uplink data transmission. This method may avoid prolonged data transmission timing resulted from path migration failures.

It should be noted that the components or modules related to this disclosure are only described above. However, this disclosure is not limited thereto, and the message transmission apparatus 2200-2300 of the embodiments of this disclosure may further include other components or modules, and reference may be made to related techniques for particulars of these components or modules.

Furthermore, for the sake of simplicity, connection relationships between the components or modules or signal profiles thereof are only illustrated in FIGS. 22 and 23. However, it should be understood by those skilled in the art that such related techniques as bus connection, etc., may be adopted. And the above components or modules may be implemented by hardware, such as a processor, a memory, a transmitter, and a receiver, etc., which are not limited in the embodiments of this disclosure.

Embodiments of a Sixth Aspect

The embodiments of this disclosure provide a message transmission apparatus.

Figure 24:
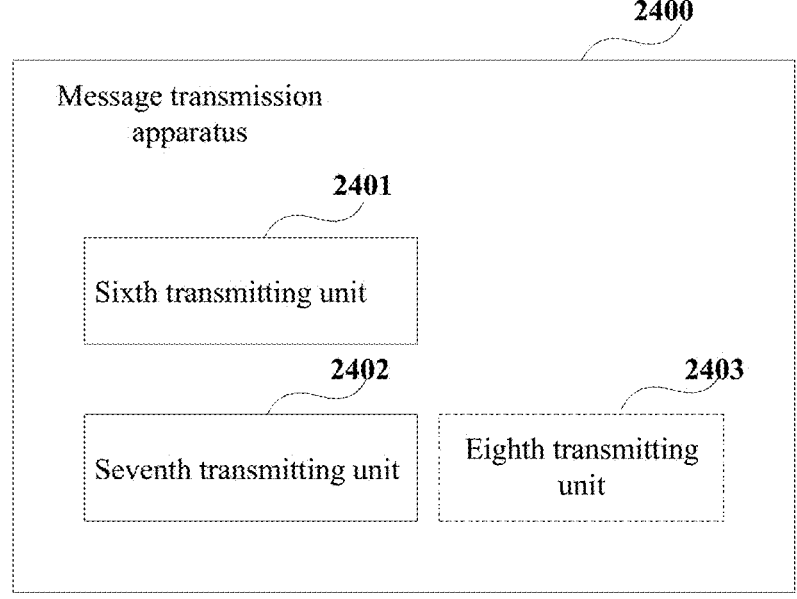
FIG. 24 is still another schematic diagram of the message transmission apparatus of the embodiment of this disclosure.

FIG. 24 is a schematic diagram of the message transmission apparatus of the embodiment of this disclosure. The apparatus may be, for example, a donor device in an IAB system, or one or some components or assemblies configured in the donor device. The IAB system includes a donor device and an IAB-node, and the embodiments of this disclosure shall be explained from a s donor-CU side. An implementation principle of the message transmission apparatus in the embodiments of this disclosure is similar to that in the embodiments of the third aspect, with identical parts being not going to be repeated herein any further.

FIG. 24 is a schematic diagram of the message transmission apparatus of the embodiment of this disclosure. As shown in FIG. 24, a message transmission apparatus 2400 of this disclosure embodiment includes:

a sixth transmitting unit 2401 configured to transmit a second radio resource control (RRC) reconfiguration message for path migration of a second IAB-node to a first IAB-node, so that the first IAB-node forwards the second RRC reconfiguration message to the second IAB-node when random access is successful; and a seventh transmitting unit 2402 configured to transmit a first radio resource control (RRC) reconfiguration message for path migration of the first IAB-node to the first IAB-node.

In some embodiments, the second RRC reconfiguration message is carried by a first downlink F1AP message transmitted by the donor-DU.

In some embodiments, the first RRC reconfiguration message contains a first parameter configured for the first IAB-node to change a transmission path.

In some embodiments, the first parameter includes a default backhaul RLC channel, or a default BAP route, or an IP address, configured for the first IAB-node.

In some embodiments, the first RRC reconfiguration message further includes first path migration indication information, the first path migration indication information indicating that the first RRC reconfiguration message is a reconfiguration message for the first IAB-node to perform path migration.

In some embodiments, the first RRC reconfiguration message further includes configuration information of the first indication information, the configuration information of the first indication information being used to instruct the MT of the first IAB-node to transmit the first indication information to the distribution unit (DU) of the first IAB-node when the random access of the MT of the first IAB-node is successful.

In some embodiments, the first downlink F1AP message further includes first buffer indication information, the first buffer indication information being used to instruct the first IAB-node to buffer the second RRC reconfiguration message and release it until the first indication information is received.

In some embodiments, the second RRC reconfiguration message is carried by the first RRC reconfiguration message.

In some embodiments, the first RRC reconfiguration message further includes identification information of the second IAB-node.

In some embodiments, the second RRC reconfiguration message is carried by a third downlink F1AP message, the third downlink F1AP message being carried by the first RRC reconfiguration message.

In some embodiments, the third downlink F1AP message further includes the identification information of the second IAB-node.

In some embodiments, the first RRC reconfiguration message further includes configuration information of the path migration failure indication information, the configuration information of the path migration failure indication information being used to indicate that the first IAB-node transmits the path migration failure indication information to the second IAB-node when the random access fails.

In some embodiments, the second RRC reconfiguration message contains a second parameter configured for the second IAB-node to change a transmission path.

In some embodiments, the second parameter includes a default backhaul RLC channel, or a default BAP route, or an IP address, configured for the second IAB-node.

In some embodiments, the second RRC reconfiguration message contains second path migration indication information, the second path migration indication information being used to indicate that the second RRC reconfiguration message is a reconfiguration message for the second IAB-node to perform path migration.

In some embodiments, the second RRC reconfiguration message further includes configuration information of the second indication information, the configuration information of the second indication information being used to indicate that the MT of the second IAB-node transmits the second indication information to the DU of the second IAB-node when receiving the second RRC reconfiguration message.

In some embodiments, the apparatus further includes an eighth transmitting unit 2403 (optional) configured to transmit a third RRC reconfiguration message for path migration of the third IAB-node to the second IAB-node.

In some embodiments, the third RRC reconfiguration message is carried by a second downlink F1AP message transmitted by the donor-CU.

In some embodiments, the second downlink F1AP message further includes second buffer indication information, the second buffer indication information being used to instruct the second IAB-node to buffer the third RRC reconfiguration message and release it until the second indication information is received.

In some embodiments, the third RRC reconfiguration message is contained in the second RRC reconfiguration message transmitted by the donor-CU and forwarded by the first IAB-node.

In some embodiments, the second RRC reconfiguration message further includes identification information of the third IAB-node.

In some embodiments, the third RRC reconfiguration message is carried by a fourth downlink F1AP message, the fourth downlink F1AP message being carried by the second RRC reconfiguration message.

In some embodiments, the fourth downlink F1AP message further includes identification information of the third IAB-node.

In some embodiments, the apparatus further includes an eighth receiving unit (optional, not shown in figures) configured to receive a first RRC reconfiguration complete message transmitted by the first IAB-node.

In some embodiments, the eighth receiving unit is further configured to receive a second RRC reconfiguration complete message transmitted by the second IAB-node, the second RRC reconfiguration complete message being carried by the first uplink F1AP message transmitted by the first IAB-node.

In some embodiments, the first RRC reconfiguration complete message further contains a third uplink F1AP message, the third uplink F1AP message containing the second RRC reconfiguration complete message.

In some embodiments, the first RRC reconfiguration complete message further contains a second RRC reconfiguration message.

It should be noted that the components or modules related to this disclosure are only described above. However, this disclosure is not limited thereto, and the message transmission apparatus 2400 of the embodiments of this disclosure may further include other components or modules, and reference may be made to related techniques for particulars of these components or modules.

Furthermore, for the sake of simplicity, connection relationships between the components or modules or signal profiles thereof are only illustrated in FIG. 24. However, it should be understood by those skilled in the art that such related techniques as bus connection, etc., may be adopted. And the above components or modules may be implemented by hardware, such as a processor, a memory, a transmitter, and a receiver, etc., which are not limited in the embodiments of this disclosure.

Embodiments of a Seventh Aspect

Figure 25:
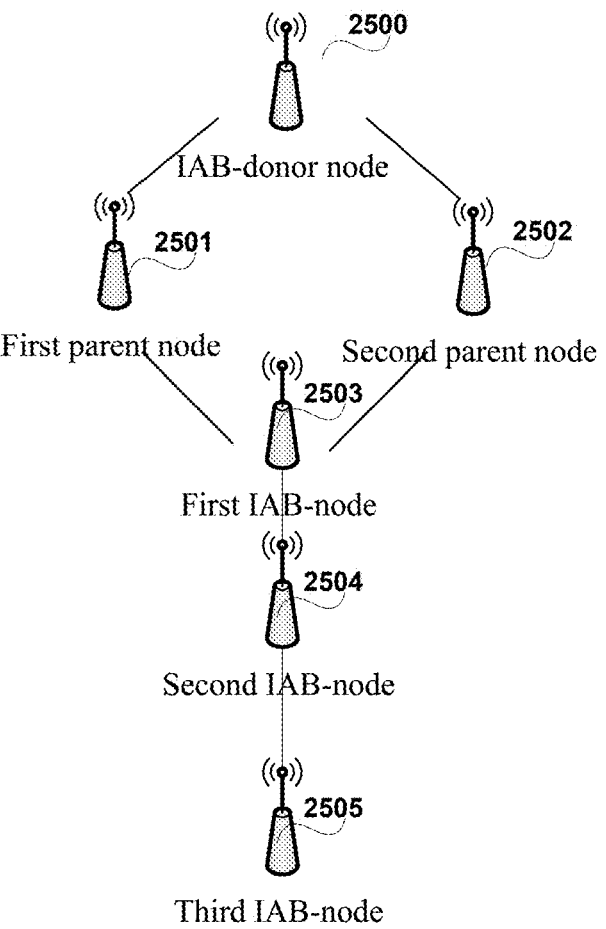
FIG. 25 is a schematic diagram of the communication system of an embodiment of this disclosure.

The embodiments of this disclosure provide a communication system. FIG. 25 is a schematic diagram of a communication system 2500. As shown in FIG. 25, the communication system 2500 includes a donor device 2500, IAB-nodes 2501, 2502, 2503, 2504 and 2505, wherein the IAB-node 2503 is a migrating IAB-node (a first IAB-node), the IAB-node 2501 is taken as a source node (a first parent node) of the IAB-node 2503, the IAB-node 2502 is taken as a target node (a second parent node) of the IAB-node 2503, the donor device 2500 is taken as a donor-CU, the IAB-node 2504 is a downstream node of the IAB-node 2503, and the IAB-node 2505 is a downstream node of the IAB-node 2504.

For the sake of simplicity, description is given in FIG. 25 by taking the donor device and the IAB-nodes as examples; however, the embodiments of this disclosure are not limited thereto. Reference may be made to relevant technologies for network architectures of the donor device and the IAB-nodes, which shall not be repeated herein any further.

In some embodiments, the IAB-node 2503 is configured to carry out the method executed by the first IAB-node in the embodiments of the first aspect, and may include the apparatus shown in FIG. 21. In some embodiments, the IAB-node 2504 is configured to carry out the method executed by the second IAB-node in the embodiments of the second aspect, and may include the apparatus shown in FIG. 22 or 23. In some embodiments, the donor device 2500 is configured to carry out the method executed by the donor-CU in the embodiments of the third aspect, and may include the apparatus shown in FIG. 24. Reference may be made to the embodiments of the first to third aspects for the relevant contents of the donor device 2500 and the IAB-nodes, which shall not be repeated herein any further.

In some embodiments, the IAB-node 2501 corresponds to the first parent node, and is used to receive the downlink F1AP message containing the first RRC reconfiguration message transmitted by the donor-CU in the embodiments of the first aspect, or receive a downlink F1AP message with a structure as shown in FIG. 19A or 20A, and forwards the first RRC reconfiguration message in the F1AP message to the IAB-node 2503.

In some embodiments, the IAB-node 2502 corresponds to the second parent node, and is used to receive the first RRC reconfiguration complete message transmitted by the IAB-node 2503, contain the first RRC reconfiguration complete message in an uplink F1AP message and transmit it to the donor-CU, the uplink F1AP message having a structure as shown in FIG. 19B or 20B.

The embodiments of this disclosure further provide an IAB-node.

FIG. 26 is a schematic diagram of the IAB-node of the embodiment of this disclosure. As shown in FIG. 26, an IAB-node 2600 may include a processor 2601 and a memory 2602, the memory 2602 storing data and programs and being coupled to the processor 2601. It should be noted that this figure is illustrative only, and other types of structures may also be used, so as to supplement or replace this structure and achieve a telecommunications function or other functions.

For example, the processor 2601 may be configured to execute a program to carry out the method executed by the IAB-node or the first parent node or the second parent node in the embodiments of the first aspect or the second aspect.

As shown in FIG. 26, the IAB-node 2600 may further include a communication module 2603, an input unit 2604, a display 2605, and a power supply 2606, wherein functions of the above components are similar to those in the related art, which shall not be described herein any further. It should be noted that the IAB-node 2600 does not necessarily include all the parts shown in FIG. 26, and the above components are not necessary. Furthermore, the IAB-node 2600 may include parts not shown in FIG. 26, and the related art may be referred to.

The embodiments of this disclosure further provide a donor device.

FIG. 27 is a schematic diagram of the donor device of the embodiment of this disclosure. As shown in FIG. 27, a donor device 2700 may include a processor (such as a central processing unit (CPU)) 2701 and a memory 2702, the memory 2702 being coupled to processor 2701. The memory 2702 may store various data, and furthermore, it may store a program for information processing, and execute the program under control of the central processing unit 2701.

For example, the processor 2701 may be configured to execute a program to carry out the method as described in the embodiments of the third aspect.

Furthermore, as shown in FIG. 27, the donor device 2700 may include a transceiver 2703, and an antenna 2704, etc., wherein functions of the above components are similar to those in the related art, which shall not be described herein any further. It should be noted that the donor device 2700 does not necessarily include all the components shown in FIG. 27; and furthermore, the donor device 2700 may include components not shown in FIG. 27, and the related art may be referred to.

An embodiment of this disclosure provides a computer readable program, which, when executed in an IAB-node, will cause a computer to carry out the method in the embodiments of the first or second aspect in the IAB-node.

An embodiment of this disclosure provides a computer storage medium, including a computer readable program, which will cause a computer to carry out the method in the embodiments of the first or second aspect in the IAB-node.

An embodiment of this disclosure provides a computer readable program, which, when executed in a donor device, will cause a computer to carry out the method in the embodiments of the third aspect in the donor device.

An embodiment of this disclosure provides a computer storage medium, including a computer readable program, which will cause a computer to carry out the method in the embodiments of the third aspect in the donor device.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to the above implementations disclosed in the embodiments, following supplements are further disclosed.

1. A message transmission method, characterized in that the method includes:

receiving, by a first integrated access and backhaul node (IAB-node), a second radio resource control (RRC) reconfiguration message for path migration of a second IAB-node from a donor central unit (donor-CU), wherein the second IAB-node is a downstream child node of the first IAB-node;

receiving, by the first IAB-node, a first RRC reconfiguration message for path migration of the first IAB-node from the donor-CU; and forwarding the second RRC reconfiguration message to the second IAB-node by the first IAB-node when random access is successful.

2. The method according to supplement 1, wherein the second RRC reconfiguration message is carried by a first downlink F1AP message transmitted by the donor-CU.

3. The method according to supplement 2, wherein the forwarding the second RRC reconfiguration message to the second IAB-node by the first IAB-node when random access is successful includes:

when random access of a mobile terminal (MT) of the first IAB-node is successful, transmitting first indication information to a distribution unit (DU) of the first IAB-node by the first IAB-node; and forwarding the second RRC reconfiguration message to the second IAB-node by the distribution unit (DU) of the first IAB-node when receiving the first indication information.

4. The method according to supplement 3, wherein when the first RRC reconfiguration message contains a first parameter configured for the first IAB-node to change a transmission path, the MT of the first IAB-node transmits the first indication information to the DU of the first IAB-node.

5. The method according to supplement 4, wherein the first parameter configured for the first IAB-node to change a transmission path includes a default backhaul RLC channel, or a default BAP route, or an IP address, configured for the first IAB-node.

6. The method according to supplement 3, wherein when the first RRC reconfiguration message contains first path migration indication information, the MT of the first IAB-node transmits the first indication information to the DU of the second IAB-node, the first path migration indication information indicating that the first RRC reconfiguration message is a reconfiguration message for the first IAB-node to perform path migration.

7. The method according to supplement 3, wherein the first RRC reconfiguration message further includes configuration information of the first indication information, the configuration information of the first indication information being used to instruct the MT of the first IAB-node to transmit the first indication information to the distribution unit (DU) of the first IAB-node when the random access of the MT of the first IAB-node is successful.

8. The method according to supplement 4, wherein the first downlink F1AP message further includes first buffer indication information, the first buffer indication information being used to instruct the first IAB-node to buffer the second RRC reconfiguration message and release it until the first indication information is received.

9. The method according to supplement 1, wherein the second RRC reconfiguration message is carried by the first RRC reconfiguration message.

10. The method according to supplement 9, wherein the first RRC reconfiguration message further includes identification information of the second IAB-node.

11. The method according to supplement 1, wherein the second RRC reconfiguration message is carried by a third downlink F1AP message from the donor-CU, the third downlink F1AP message being carried by the first RRC reconfiguration message.

12. The method according to supplement 11, wherein third downlink F1AP message further includes the identification information of the second IAB-node.

13. The method according to supplement 11, wherein the forwarding the second RRC reconfiguration message to the second IAB-node by the first IAB-node when random access is successful includes:

when the random access is successful, transmitting the third downlink F1AP message to the DU of the first IAB-node by the MT of the first IAB-node; and forwarding the second RRC reconfiguration message in the third downlink F1AP message to the second IAB-node by the DU of the first IAB-node when receiving the third downlink F1AP message.

14. The method according to supplement 1, wherein the method further includes:

transmitting path migration failure indication information to the second IAB-node by the first IAB-node when the random access fails.

15. The method according to supplement 14, wherein the method further includes: forwarding the second RRC reconfiguration message by the first IAB-node to the second IAB-node, or clearing the second RRC reconfiguration message by the first IAB-node.

16. The method according to supplement 14, wherein first RRC reconfiguration message contains the first parameter configured for the first IAB-node to change a transmission path and/or the first path migration indication information, the path migration failure indication information is transmitted to the second IAB-node.

17. The method according to supplement 14, wherein first RRC reconfiguration message further includes configuration information of the path migration failure indication information, the configuration information of the path migration failure indication information being used to instruct the first IAB-node to transmit the path migration failure indication information to the second IAB-node when the random access fails.

18. The method according to supplement 1, wherein when the random access of the first IAB-node is successful, the method further includes:

transmitting a first RRC reconfiguration complete message by the first IAB-node to the donor-CU; and receiving, by the first IAB-node, a second RRC reconfiguration complete message transmitted by the second IAB-node.

19. The method according to supplement 18, wherein the method further includes: forwarding the second RRC reconfiguration complete message by the first IAB-node to the donor-CU, the second RRC reconfiguration complete message being carried by a first uplink F1AP message.

20. The method according to supplement 18, wherein the method further includes: containing the second RRC reconfiguration complete message in the first RRC reconfiguration complete message and forwarding it to the donor-CU by the first IAB-node.

21. The method according to supplement 18, wherein the method further includes:

receiving, by the DU of the first IAB-node, the second RRC reconfiguration complete message transmitted by the second IAB-node;

transmitting a third uplink F1AP message containing the second RRC reconfiguration complete message by the DU of the first IAB-node to the MT of the first IAB-node; and containing the third uplink F1AP message in the first RRC reconfiguration complete message and forwarding it to the donor-CU by the MT of the first IAB-node.

22. A message transmission method, characterized in that the method includes:

receiving a third RRC reconfiguration message for path migration of a third IAB-node by a second IAB-node from a donor-CU; and forwarding the third RRC reconfiguration message to the third IAB-node by the second IAB-node when receiving a second RRC reconfiguration message transmitted by the donor-CU and forwarded by the first IAB-node, the second RRC reconfiguration message being used for path migration of the second IAB-node;

wherein the third IAB-node is a downstream child node of the second IAB-node, and the second IAB-node is a downstream child node of the first IAB-node.

23. The method according to supplement 22, wherein the third RRC reconfiguration message is carried by a second downlink F1AP message transmitted by the donor-CU.

24. The method according to Supplement 22, wherein when the forwarding the third RRC reconfiguration message to the third IAB-node by the second IAB-node when receiving a second RRC reconfiguration message transmitted by the donor-CU and forwarded by the first IAB-node includes:

transmitting second indication information to a DU of the second IAB-node by an MT of the second IAB-node when receiving the second RRC reconfiguration message; and forwarding the third RRC reconfiguration message to the third IAB-node by the DU of the second IAB-node when receiving the second indication information.

25. The method according to supplement 24, wherein when the second RRC reconfiguration message contains a second parameter configured for the second IAB-node to change a transmission path, the MT of the second IAB-node transmits second indication information to the DU of the second IAB-node.

26. The method according to supplement 25, wherein the second parameter configured for the second IAB-node to change a transmission path includes a default backhaul RLC channel, or a default BAP route, or an IP address, configured for the second IAB-node.

27. The method according to supplement 24, wherein when the second RRC reconfiguration message contains second path migration indication information, the MT of the second IAB-node transmits the second indication information to the DU of the second IAB-node, the second path migration indication information being used to indicate that the second RRC reconfiguration message is a reconfiguration message for the second IAB-node to perform path migration.

28. The method according to supplement 24, wherein the second RRC reconfiguration message further contains configuration information of the second indication information, the configuration information of the second indication information is used to instruct the MT of the second IAB-node to transmit the second indication information to the distribution unit (DU) of the second IAB-node when receiving the second RRC reconfiguration message.

29. The method according to supplement 23, wherein the second downlink F1AP message further contains second buffer indication information, the second buffer indication information being used to instruct the second IAB-node to buffer the third RRC reconfiguration message and release it until the second indication information is received.

30. The method according to supplement 22, wherein the third RRC reconfiguration message is contained in the second RRC reconfiguration message transmitted by the donor-CU and forwarded by the first IAB-node.

31. The method according to supplement 30, wherein the second RRC reconfiguration message further contains identification information of the third IAB-node.

32. The method according to supplement 22, wherein the third RRC reconfiguration message is carried by a fourth downlink F1AP message transmitted by the donor-CU, the fourth downlink F1AP message being carried by the third RRC reconfiguration message.

33. The method according to supplement 32, wherein the fourth downlink F1AP message further contains identification information of the third IAB-node.

34. The method according to supplement 32, wherein the forwarding the third RRC reconfiguration message to the third IAB-node by the second IAB-node when receiving a second RRC reconfiguration message transmitted by the donor-CU and forwarded by the first IAB-node includes:
   transmitting the fourth downlink F1AP message to the DU of the second IAB-node by the MT of the second IAB-node when receiving the second RRC reconfiguration message transmitted by the donor-CU and forwarded by the first IAB-node; and
   forwarding the third RRC reconfiguration message in the fourth downlink F1AP message to the third IAB-node by the DU of the second IAB-node when receiving the fourth downlink F1AP message.

35. The method according to supplement 22, wherein when the second IAB-node receives the second RRC reconfiguration message, the method further includes:
   transmitting a second RRC reconfiguration complete message by the second IAB-node to the first IAB-node; and
   receiving, by the second IAB-node, a third RRC reconfiguration complete message transmitted by the third IAB-node.

36. The method according to supplement 35, wherein the method further includes: forwarding the third RRC reconfiguration complete message by the second IAB-node to the donor-CU, the third RRC reconfiguration complete message being carried by a second uplink F1AP message.

37. The method according to supplement 36, wherein the method further includes:
   containing the third RRC reconfiguration complete message in the second RRC reconfiguration complete message and forwarding it to the donor-CU by the second IAB-node.

38. The method according to supplement 35, wherein the method further includes: receiving, by the DU of the second IAB-node, the third RRC reconfiguration complete message transmitted by the third IAB-node;
   transmitting a fourth uplink F1AP message containing the third RRC reconfiguration complete message by the DU of the second IAB-node to the MT of the second IAB-node; and
   containing the fourth uplink F1AP message in the second RRC reconfiguration complete message and forwarding it to the donor-CU by the MT of the second IAB-node.

39. A message transmission method, characterized in that the method includes:
   receiving, by a second IAB-node, a third RRC reconfiguration message for path migration of a third IAB-node from a donor-CU;
   receiving, by the second IAB-node, path migration failure indication information transmitted by a first IAB-node when random access fails; and
   triggering an RRC reestablishment procedure or falling back to original path configuration by the second IAB-node;
   wherein the third IAB-node is a downstream child node of the second IAB-node, and the second IAB-node is a downstream child node of the first IAB-node.

40. The method according to supplement 39, wherein the method further includes:
   forwarding the path migration failure indication information by the second IAB-node to the third IAB-node.

41. The method according to supplement 39, wherein the method further includes:
   forwarding the third RRC reconfiguration message to the third IAB-node, or clearing the third RRC reconfiguration message, by the second IAB-node.

42. The method according to supplement 41, wherein the third RRC reconfiguration message is carried by a second downlink F1AP message transmitted by the donor-CU, and the forwarding the third RRC reconfiguration message includes:
   transmitting second indication information by the MT of the second IAB-node to the DU of the second IAB-node; and
   forwarding the third RRC reconfiguration message carried by the second downlink F1AP message to the third IAB-node by the DU of the second IAB-node when receiving the second indication information.

43. The method according to supplement 39, wherein the method further includes:
   receiving, by the second IAB-node, a second RRC reconfiguration message for path migration of the second IAB-node transmitted by the donor-CU to the first IAB-node and forwarded by the first IAB-node.

44. A message transmission method, characterized in that the method includes:
   transmitting a second radio resource control (RRC) reconfiguration message for path migration of a second IAB-node by a donor-CU to a first IAB-node, so that the first IAB-node forwards the second RRC reconfiguration message to the second IAB-node when random access is successful; and
   transmitting a first radio resource control (RRC) reconfiguration message for path migration of the first IAB-node by the donor-CU to the first IAB-node.

45. The method according to supplement 44, wherein the second RRC reconfiguration message is carried by a first downlink F1AP message transmitted by the donor-CU.

46. The method according to supplement 45, wherein the first RRC reconfiguration message includes a first parameter for the first IAB-node to change transmission path configuration.

47. The method according to supplement 46, wherein the first parameter includes a default backhaul RLC channel, or a default BAP route, or an IP address, configured for the first IAB-node.

48. The method according to supplement 45, wherein the first RRC reconfiguration message includes first path migration indication information, the first path migration indication information indicating that the first RRC reconfiguration message is a reconfiguration message used by the first IAB-node for performing path migration.

49. The method according to supplement 45, wherein the first RRC reconfiguration message further includes configuration information of the first indication information, the configuration information of the first indication information being used to instruct the MT of the first IAB-node to transmit the first indication information to the distribution unit (DU) of the first IAB-node when the random access is successful.

50. The method according to supplement 45, wherein the first downlink F1AP message further includes first buffer indication information, the first buffer indication information being used to instruct the first IAB-node to buffer the second RRC reconfiguration message and release it until the first indication information is received.

51. The method according to supplement 44, wherein the second RRC reconfiguration message is carried by the first RRC reconfiguration message.

52. The method according to supplement 51, wherein the first RRC reconfiguration message further includes identification information of the second IAB-node.

53. The method according to supplement 44, wherein the second RRC reconfiguration message is carried by the third downlink F1AP message, the third downlink F1AP message being carried by the first RRC reconfiguration message.

54. The method according to supplement 53, wherein the third downlink F1AP message further includes identification information of the second IAB-node.

55. The method according to supplement 44, wherein the first RRC reconfiguration message further includes configuration information of the path migration failure indication information, the configuration information of the path migration failure indication information being used to indicate that the first IAB-node transmits the path migration failure indication information to the second IAB-node when the random access fails.

56. The method according to supplement 44, wherein the second RRC reconfiguration message includes a second parameter for the second IAB-node to change transmission path configuration.

57. The method according to supplement 56, wherein the second parameter includes a default backhaul RLC channel, or a default BAP route, or an IP address, configured for the second IAB-node.

58. The method according to supplement 55, wherein the second RRC reconfiguration message includes second path migration indication information, the second path migration indication information being used to indicate that the second RRC reconfiguration message is a reconfiguration message used for the second IAB-node to perform path migration.

59. The method according to supplement 56, wherein the second RRC reconfiguration message further includes configuration information of the second indication information, the configuration information of the second indication information being used to indicate that the MT of the second IAB-node transmits the second indication information to the DU of the second IAB-node when receiving the second RRC reconfiguration message.

60. The method according to supplement 44, wherein the method further includes: transmitting a third RRC reconfiguration message for path migration of the third IAB-node by the donor-CU to the second IAB-node.

61. The method according to supplement 60, wherein the third RRC reconfiguration message is carried by a second downlink F1AP message transmitted by the donor-CU.

62. The method according to supplement 61, wherein the second downlink F1AP message further includes second buffer indication information, the second buffer indication information being used to instruct the second IAB-node to buffer the third RRC reconfiguration message and release it until the second indication information is received.

63. The method according to supplement 60, wherein the third RRC reconfiguration message is included in the second RRC reconfiguration message transmitted by the donor-CU and forwarded by the first IAB-node.

64. The method according to supplement 63, wherein the second RRC reconfiguration message further includes identification information of the third IAB-node.

65. The method according to supplement 60, wherein the third RRC reconfiguration message is carried by a fourth downlink F1AP message, the fourth downlink F1AP message being carried by the second RRC reconfiguration message.

66. The method according to supplement 65, wherein the fourth downlink F1AP message further includes identification information of the third IAB-node.

67. The method according to supplement 44, wherein the method further includes: receiving, by the donor-CU, a first RRC reconfiguration complete message transmitted by the first IAB-node.

68. The method according to supplement 67, wherein the method further includes: receiving, by the donor-CU, a second RRC reconfiguration complete message transmitted by the second IAB-node, the second RRC reconfiguration complete message being carried by the first uplink F1AP message transmitted by the first IAB-node.

69. The method according to supplement 67, wherein the first RRC reconfiguration complete message further includes a third uplink F1AP message, the third uplink F1AP message including the second RRC reconfiguration complete message.

70. The method according to supplement 67, wherein the first RRC reconfiguration complete message further includes a second RRC reconfiguration message.

71. A donor device, including a memory and a processor, the memory storing a computer program, wherein the processor is configured to execute the computer program to carry out the method as described in any one of supplements 44-70.

72. An IAB-node, including a memory and a processor, the memory storing a computer program, wherein the processor is configured to execute the computer program to carry out the method as described in any one of supplements 1-43.

73. A communication system, including a donor device, a first IAB-node and a second IAB-node, wherein the donor device is configured to execute the method as described in any one of supplements 44-70, the first IAB-node is configured to execute the method as described in any one of supplements 1-21, and the second IAB-node is configured to execute the method as described in any one of supplements 22-43.

The invention claimed is:

1. A message transmission apparatus, applicable to a first integrated access and backhaul node (IAB-node), the apparatus comprises:

a receiver configured to:

receive a second radio resource control (RRC) reconfiguration message for path migration of a second IAB-node while the first IAB-node is still connected with source parent node, the second radio resource control (RRC) reconfiguration message being transmitted by a donor central unit (donor-CU), the second IAB-node is a downstream child node of the first IAB-node; and receive a first RRC reconfiguration message for path migration of the first IAB-node, the first RRC reconfiguration message being transmitted by the donor-CU; and a transmitter configured to withhold the second RRC reconfiguration message to be forwarded to the second IAB node until the first IAB-node has successfully performed a random access procedure to the target parent node, wherein the second RRC reconfiguration message is carried by a first downlink F1AP message transmitted by the donor-CU, and wherein the first RRC reconfiguration message includes a first parameter configured for the first IAB-node to change a transmission path, the first parameter including:

a default backhaul RLC channel configured for the first IAB-node, a default BAP route configured for the first IAB-node, or an IP address configured for the first IAB-node.

2. The apparatus according to claim 1, wherein the first downlink F1AP message further includes first buffer indication information, the first buffer indication information being used to instruct the first IAB-node to buffer the second RRC reconfiguration message.

3. The apparatus according to claim 1, wherein the transmitter is further configured to transmit path migration failure indication information to the second IAB-node when the random access of the first IAB-node fails.

4. The apparatus according to claim 1, wherein the first RRC reconfiguration message includes a first parameter configured for the first IAB-node to change a transmission path or first path migration indication information, and the transmitter is further configured to transmit a path migration failure indication information to the second IAB-node.

5. The apparatus according to claim 1, the transmitter is further configured to transmit, when the random access of first IAB-node is successful, a first RRC reconfiguration complete message to the donor-CU; and the receiver configured to receive a second RRC reconfiguration complete message transmitted by the second IAB-node.

6. The apparatus according to claim 5, wherein the transmitter is further configured to forward, to the Donor-CU, the first RRC reconfiguration complete message including the second RRC reconfiguration complete message.

7. The apparatus according to claim 6, wherein the receiver is further configured to receive the second RRC reconfiguration complete message transmitted by the second IAB-node, the transmitter is further configured to transmit a third uplink F1AP message containing the second RRC reconfiguration complete message to a mobile terminal (MT) of the first IAB-node.

8. A message transmission apparatus, applicable to a second integrated access and backhaul node (IAB-node), the apparatus comprises:

a receiver configured to receive a third RRC reconfiguration message for path migration of a third IAB-node from a donor-CU while a first IAB-node is still connected with source parent node; and a transmitter configured to withhold the third RRC reconfiguration message to be forwarded to the third IAB-node until receiving a second RRC reconfiguration message transmitted by the donor-CU and forwarded by the first IAB-node, the second RRC reconfiguration message being used for path migration of a second IAB-node;

the third IAB-node is a downstream child node of the second IAB-node, and the second IAB-node is a downstream child node of the first IAB-node, wherein the third RRC reconfiguration message is carried by a second downlink F1AP message transmitted by the Donor-CU, and wherein when the second RRC reconfiguration message includes a second parameter configured for the second IAB-node to change a transmission path, the second parameter configured for the second IAB-node to change a transmission path including:

a default RLC channel configured for the second IAB-node, a default BAP routing ID configured for the second IAB-node, or an IP address configured for the second IAB-node configured for the second IAB-node.

9. The apparatus according to claim 8, wherein when the second RRC reconfiguration message contains second path migration indication information, the transmitter transmits the second indication information to the DU of the second IAB-node, the second path migration indication information being used to indicate that the second RRC reconfiguration message is a reconfiguration message for the second IAB-node to perform path migration.

10. The apparatus according to claim 8, wherein, wherein the second downlink F1AP message includes second buffer indication information, the second buffer indication information being used to indicate the second IAB-node to buffer the third RRC reconfiguration message.

* * * * *